(12) United States Patent
Cheng et al.

(10) Patent No.: US 6,606,689 B1
(45) Date of Patent: Aug. 12, 2003

(54) METHOD AND APPARATUS FOR PRE-CACHING DATA IN AUDIO MEMORY

(75) Inventors: Howard H. Cheng, Sammamish, WA (US); Dan Shimizu, Palo Alto, CA (US); Genyo Takeda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 240 days.

(21) Appl. No.: 09/722,667

(22) Filed: Nov. 28, 2000

Related U.S. Application Data

(60) Provisional application No. 60/226,899, filed on Aug. 23, 2000.

(51) Int. Cl.[7] .............................................. G06F 12/00
(52) U.S. Cl. ........................................ 711/137; 712/207
(58) Field of Search ........................ 711/137; 709/203, 709/231; 345/430, 520, 522; 712/205–207

(56) References Cited

U.S. PATENT DOCUMENTS

| | | |
|---|---|---|
| 4,388,620 A | 6/1983 | Sherman |
| 4,425,559 A | 1/1984 | Sherman |
| 4,570,233 A | 2/1986 | Yan et al. |
| 4,658,247 A | 4/1987 | Gharachorloo |
| 4,725,831 A | 2/1988 | Coleman |
| 4,829,295 A | 5/1989 | Hiroyuki |
| 4,862,392 A | 8/1989 | Steiner |
| 4,866,637 A | 9/1989 | Gonzalez-Lopez et al. |
| 4,901,064 A | 2/1990 | Deering |
| 4,914,729 A | 4/1990 | Omori et al. |
| 4,945,500 A | 7/1990 | Deering |
| 5,136,664 A | 8/1992 | Bersack et al. |
| 5,170,468 A | 12/1992 | Shah et al. |
| 5,239,654 A | 8/1993 | Ing-Simmons et al. ..... 395/800 |
| 5,392,385 A | 2/1995 | Evangelisti et al. |
| 5,392,393 A | 2/1995 | Deering |
| 5,421,028 A | 5/1995 | Swanson |
| 5,457,775 A | 10/1995 | Johnson, Jr. et al. |
| 5,504,917 A | 4/1996 | Austin |
| 5,553,220 A * | 9/1996 | Keene ........................ 345/520 |
| 5,594,854 A | 1/1997 | Baldwin et al. |
| 5,608,424 A | 3/1997 | Takahashi et al. |

(List continued on next page.)

FOREIGN PATENT DOCUMENTS

| | | |
|---|---|---|
| CA | 2070934 | 12/1993 |
| EP | 1 074 945 | 2/2001 |
| EP | 1 075 146 | 2/2001 |
| EP | 1 081 649 | 3/2001 |

(List continued on next page.)

OTHER PUBLICATIONS

Inside Sony's Next Generation Playstation, ©1999.
Press Releases, Mar. 18, 1999.
Chris Johnston, "Playstation Part Deux", Press Start, ©1999.
Nikkei Shimbun, "Sony Making SME, Chemical and SPT into Wholly–Owned Subsidiaries", Mar. 9, 1999.

(List continued on next page.)

Primary Examiner—Do Hyun Yoo
Assistant Examiner—Nasser Moazzami
(74) Attorney, Agent, or Firm—Nixon & Vanderhye, P.C.

(57) ABSTRACT

A video game system includes an audio digital signal processor, a main memory and an audio memory separate from the main memory and storing audio-related data for processing by the audio digital signal processor. Memory access circuitry reads non-audio-related data stored on a mass storage device and writes the non-audio-related data to the audio memory. The non-audio-related data is later read from the audio memory and written to the main memory.

50 Claims, 15 Drawing Sheets

U.S. PATENT DOCUMENTS

| | | | |
|---|---|---|---|
| 5,687,357 A | | 11/1997 | Priem |
| 5,701,444 A | | 12/1997 | Baldwin |
| 5,721,947 A | | 2/1998 | Priem et al. |
| 5,727,192 A | | 3/1998 | Baldwin |
| 5,732,224 A | | 3/1998 | Gulick et al. ............... 395/280 |
| 5,758,182 A | | 5/1998 | Rosenthal et al. |
| 5,764,243 A | | 6/1998 | Baldwin |
| 5,768,626 A | | 6/1998 | Munson et al. |
| 5,768,629 A | | 6/1998 | Wise et al. |
| 5,774,133 A | | 6/1998 | Neave et al. |
| 5,777,629 A | | 7/1998 | Baldwin |
| 5,798,770 A | | 8/1998 | Baldwin |
| 5,799,150 A | * | 8/1998 | Hamilton et al. ........... 709/203 |
| 5,801,706 A | | 9/1998 | Fujita et al. |
| 5,801,716 A | | 9/1998 | Silverbrook |
| 5,805,868 A | | 9/1998 | Murphy |
| 5,813,027 A | | 9/1998 | Lahti et al. ................. 711/118 |
| 5,815,166 A | | 9/1998 | Baldwin |
| 5,821,949 A | | 10/1998 | Deering |
| 5,822,537 A | * | 10/1998 | Katseff et al. ............... 709/231 |
| 5,874,969 A | | 2/1999 | Storm et al. |
| 5,897,437 A | | 4/1999 | Nishiumi et al. ............. 463/47 |
| 5,917,496 A | | 6/1999 | Fujita et al. |
| 5,920,326 A | | 7/1999 | Rentschler et al. |
| 5,940,086 A | | 8/1999 | Rentschler et al. |
| 5,949,424 A | | 9/1999 | Cabral et al. |
| 5,949,440 A | | 9/1999 | Krech, Jr. et al. |
| 5,969,726 A | | 10/1999 | Rentschler et al. |
| 5,977,997 A | | 11/1999 | Vainsencher ................ 345/519 |
| 5,990,902 A | * | 11/1999 | Park ........................... 345/430 |
| 5,999,196 A | | 12/1999 | Storm et al. |
| 6,002,409 A | | 12/1999 | Harkin |
| 6,023,738 A | | 2/2000 | Priem et al. |
| 6,025,853 A | | 2/2000 | Baldwin |
| 6,028,611 A | | 2/2000 | Anderson et al. |
| 6,037,949 A | | 3/2000 | DeRose et al. |
| 6,057,852 A | | 5/2000 | Krech, Jr. |
| 6,092,124 A | | 7/2000 | Priem et al. |
| 6,092,154 A | | 7/2000 | Curtis et al. ................. 711/137 |
| 6,119,217 A | | 9/2000 | Suzuoki ....................... 712/36 |
| 6,124,868 A | | 9/2000 | Asaro et al. ................. 345/513 |
| 6,141,025 A | | 10/2000 | Oka et al. .................. 345/521 |
| 6,166,748 A | * | 12/2000 | Van Hook et al. .......... 345/522 |
| 6,173,367 B1 | | 1/2001 | Aleksic et al. |
| 6,173,381 B1 | | 1/2001 | Dye ........................... 711/170 |
| 6,181,352 B1 | | 1/2001 | Kirk et al. |
| 6,198,488 B1 | | 3/2001 | Lindholm et al. |
| 6,226,012 B1 | | 5/2001 | Priem et al. |

FOREIGN PATENT DOCUMENTS

| | | |
|---|---|---|
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO 94/10641 | 5/1994 |
| WO | WO 94/10641 | 11/1994 |

OTHER PUBLICATIONS

AM News: Japanese Developers Not All Sold on PS2, Next Generation, Mar. 16, 1999.

Sony To Turn PlayStation Maker Into Wholly Owned Unit–Nikkei, Dow Jones News Service, Mar. 8, 1999.

Yumiko Ono, Sony Antes Up Its Chips In Bet On New Game System, Dow Jones News Service, Mar. 4, 1999.

MacWeek.Com Gets Inside Story on Connective VGS for Windows; Controversial Emulator of Sony PlayStation Games Cureentyl Available for Macs Only, Business Wire, Mar. 12, 1999.

"DexDrive Bridges Gap", The Tampa Tribune, Mar. 12, 1999.

A Microprocessor With a 128b CPU, 10 Floating–Point MAC's, 4 Floating–Point Dividers, and an MPEG2 Decoder, 1999 IEEE International Solid–State Circuits Conference, Feb. 16, 1999.

Dreamcast Instuction Manual, Sega Enterprises, Ltd., ©1998.

"Sega To Launch Video Camera for Dreamcast", Reuters Business News, Feb. 16, 2000.

David Pescovitz, "Dream On", Wired, Aug. 1999.

Randy Nelson, "Dreamcast 101: Everything You Ever Wanted To Know About Sega's Powerful New Console", Official Sega Dreamcast Magazine, Jun. 1999.

2D/3D Graphics Card User Manual, Guillemot ©1999.

Nintendo 64 Instruction Booklet, Nintendo of America, 1998.

Steven Levy, "Here Comes PlayStation II", Newsweek, Mar. 6, 2000.

David Sheff, "Sony Smackage: Test Driving The Playstation II", Wired, Nov. 1999.

Introducing The Next Generation PlayStation, Sony Computer Entertainment Inc., ©1999.

Leadtek GTS, Aug. 3, 2000, www.hexus.net.

Voodoo 5 5500 Review, Jul. 26, 2000, www.hexus.net.

ATI Radeon 64 Meg DDR OEM, Aug. 19, 2000, www.hexus.net.

Microsoft Xbox—The Future of Gaming, Microsoft Xbox Performance Sheet, www.xbox.com.

Robert L. Cook, "Shade Trees", Computer Graphics, vol. 18, No. 3, Jul. 1984.

Wang et al., "Second–Depth Shadow Mapping", Department of Computer Science, Univ. N.C., Chapel Hill, N.C. pp. 1–7.

Peercy et al., "Efficient Bump Mapping Hardware", Computer Graphics Proceedings, Annual Conference Series, 1997.

Gustavo Oliveira, "Refractive Texture Mapping, Part One", www.gamasutra.com, Nov. 10, 2000.

John Schlag, Fast Embossing Effects on Raster Image Data, Graphics Gems IV, Edited by Paul S. Heckbert, Computer Science Department, Carnegie Mellon University, Academic Press, Inc., 1994, pp. 433–437.

James L. Blinn, "Simulation Wrinkled Surfaces," Caltech/JPL, pp. 286–292, SIGGRAPH 78 (1978).

Tomas Möller and Eric Haines "Real–Time Rendering", AK Peters, Ltd., ©1999, pp. 127–142.

Technical Presentation: Vertex Buffers, posted Jun. 12, 2000, www.nvidia.com.

Technical Presentation: Hardware Transform and Lighting, www.nvidia.com, posted Jun. 12, 2000.

Technical Presentation: Hardware Bump–mapping Choices and Concepts, Jun. 7, 2000, www.nvidia.com.

Technical Presentation: How to Bump Map a Skinned Polygonal Model, Jun. 7, 2000, www.nvidia.com.
Technical Presentation: Computations for Hardware Lighting and Shading, Mar. 17, 2000, www.nvidia.com.
Photograph of Sony PlayStation II System.
Photograph of Sega Dreamcast System.
Photograph of Nintendo 64 System.
Whitepaper: 3D Graphics Demystified, Nov. 11, 1999, www.nvidia.com.
Whitepaper: "Z Buffering, Interpolation and More W–Buffering", Doug Rogers, Jan. 31, 2000, www.nvidia.com.
Whitepaper: Using $GL_{13}$ NV_$vertex_{13}$ array and GL_NV_fence, posted Aug. 1, 2000, www.nvidia.com.
Whitepaper: Anisotropic Texture Filtering in OpenGL, posted Jul. 17, 2000, www.nvidia.com.
Whitepaper: Mapping Texels to Pixels in D3D, posted Apr. 5, 2000, www.nvidia.com.
Whitepaper: Guard Band Clipping, posted Jan. 31, 2000, www.nvidia.com.
Whitepaper: Cube Environment Mapping, posted Jan. 14, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lighting, Nov. 10, 1999, www.nvidia.com.
Technical Brief: What's New With Microsoft DirectX7, posted Nov. 10, 1999, www.nvidia.com.
Mitchell et al., "Multitexturing in DirectX6", Game Developer, Sep. 1998, www.gdmag.com.
Vision Tek, "GeForce2 GS Graphics Processing Unit", ©2000 www.visiontek.com.
Jim Bushnell et al., "Advanced Multitexture Effects With Direct3D and OpenGL", Pyramid Peak Design & ATI Research, Inc., GameDevelopers Conference, ©1999.
Sony PlayStation II Instruction Manual, Sony Computer Entertainment Inc., ©2000.
Stand and Be Judged, Next Generation, May 2000.
PlayStation II: Hardware Heaven or Hell?, Next Generation, Jan. 2000.
Chris Charla, "Play Station II: The Latest News", Next Generation, Sep. 1999.
"First PlayStation II Gameplay Screens Revealed!", Next Generation, Sep. 1999.
Game Enthusiast Online Highlights, Mar. 18, 1999.
Game Enthusiast Online Highlights, Mar. 19, 1999.
Game Enthusiast Online Highlights, Mar. 17, 1999.
Game Enthusiast Online Highlights, Oct. 20, 1999.
Joel Easley, "PlayStation II Revealed", Game Week, Sep. 29, 1999.
Technical Presentation: Practical Bump–mapping for Today's GPUs, Mar. 17, 2000 www.nvidia.com.
Technical Presentation: Shadows, Transparency, & Fog, Mar. 17, 2000, www.nvidia.com.
Technical Presentation: GeForce 256 Register Combiners, Mar. 17, 2000, www.nvidia.com.
Technical Presentation: TexGen & The Texture Matrix, Mar. 15, 2000 www.nvidia.com.
Technical Presentation: Toon Shading, Mar. 15, 2000, www.nvidia.com.
Technical Presentation: D3D 7 Vertex Lighting, Mar. 15, 2000, www.nvidia.com.
Technical Presentation: Per–Pixel Lighting (by S. Dietrich) Mar. 14, 2000 www.nvidia.com.
Technical Presentation: GeForce 256 and RIVA TNT Combiners, Dec. 8, 1999, www.nvidia.com.
Technical Presentation: Vertex Cache Optimization, Nov. 12, 1999, www.nvidia.com.
Technical Presentation: Vertex Blending, Nov. 12, 1999, www.nvidia.com.
Technical Presentation: Hardware Transform and Lighting, Nov. 12, 1999, www.nvidia.com.
Technical Presentation: GeForce 256 Overview, Nov. 12, 1999, www.nvidia.com.
Technical Presentation: DirectX 7 and Texture Management, Nov. 12, 1999 www.nvidia.com.
Technical Presentation: Dot Production Lighting, Nov. 12, 1999, www.nvidia.com.
Technical Presentation: Texture Coordinate Generation, Nov. 3, 1999, www.nvidia.com.
Technical Presentation: Phong Shading and Lightmaps, Nov. 3, 1999, www.nvidia.com.
Technical Presentation: The ARB_multitexture Extension, Nov. 3, 1999 www.nvidia.com.
Technical Presentation: Multitexture Combiners, Nov. 3, 1999, www.nvidia.com.
Technical Presentation: Emboss Bump Mapping, Nov. 3, 1999, www.nvidia.com.
Technical Presentation: Hardwar Accelerated Anisotropic Lighting, Nov. 3, 1999, www.nvidia.com.
Technical Presentation: Guard Band Clipping, Nov. 3, 1999, www.nvidia.com.
The RenderMan Interface, Stephan R. Keith, Version 3.1, Pixar Animation Studios, Sep. 1989.
The RenderMan Interface, Version 3.2, Pixar Animation Studios, Jul. 2000, www.pixar.com.
NVIDIA Product Overview, "GeForce2Ultra", NVIDIA Corporation, Aug. 21, 2000, www.nvidia.com.
Duke, "Dreamcast Technical Specs", Sega Dreamcast Review, Sega, 2/99, www.game–revolution.com.
Marlin Rowley, "GeForce 1 & 2 GPU Speed Tests", May 11, 2000, www.g256.com.
"Dreamcast: The Full Story", Next Generation, Sep. 1998.
DirectX 7.0 Programmer's Reference, Microsoft Corporation, 1995–1999 (as part of the DirectX 7.0 SDK on the Companion CD included with "Inside Direct3D", Microsoft Programming Series, Peter J. Kovach, Microsoft Press, 1999).
"Inside Direct3D", Microsoft Programming Series, Peter J. Kovach, Microsoft Press, 1999.
"OpenGL Programming Guide, The Official Guide to Learning OpenGL, Release 1", Jackie Nieder, Tom David, Mason Woo, Addision–Wesley Publishing Co., 1993.
"Procedural Elements for Computer Graphics," Second Edition, David F. Rogers, McGraw Hill, 1998.

"Real–Time Rendering," Tomas Molleir, Eric Haines, AK Peters, 1999.

"Computer Graphics, Principles and Practice," Second Edition, The Systems Programming Series, Foley, van Dam, Fiener, Hughes, Addison Wesley, 1990.

"Principles of Three–Dimensional Computer Animation", Revised Edition, Michael O'Rourke, W.W. Norton & Company, 1998.

* cited by examiner

Fig. 5 EXAMPLE GRAPHICS PROCESSOR FLOW

METHOD AND APPARATUS FOR PRE-CACHING DATA IN AUDIO MEMORY

RELATED APPLICATIONS

This application claims priority from provisional Application No. 60/226,899, filed Aug. 23, 2000, the contents of which are incorporated herein.

FIELD OF THE INVENTION

The present invention relates to a method and apparatus for accessing an audio memory, and more particularly, to a method and apparatus for pre-caching non-audio related data in the audio memory of a video game system.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

Interactive 3D computer graphics systems are often used to play video games. The "gaming experience" however typically involves more than just video content. For example, almost all gaming experiences involve audio content that accompanies the video content. The audio system described herein enables sound emitters to be placed in three-dimensional space and provides a powerful means of generating psycho-acoustic 3D sound effects with a pair of speakers. The audio system includes an audio memory that is usable, for example, to store sound samples, instrument wave tables, audio tracks and the like read from a mass storage device such as a DVD. The samples, wave tables, tracks, etc. are subsequently read out and processed by an audio digital signal processor to produce the game audio content. This content is transferred to a main memory from where it is subsequently read out for supply to a decoder and output to speakers. The separate audio memory improves the access for the audio processing circuitry to audio data by avoiding the need to contend with other resources (e.g., the graphics subsystem) attempting to access the main system memory.

As further described herein, the provision of a separate audio memory also provides an opportunity to further enhance the system's ability to efficiently provide access to data to resources that need such access. For example, a DVD has a relatively high "latency", i.e., it takes a relatively long time for data to be returned responsive to a request for the data. Therefore, it is useful to pre-fetch data such as animation data and compressed graphics data from the DVD prior to the time that the data is needed so that the data can be quickly provided to a component needing the data. The audio memory may be used as a cache for this "pre-fetched" non-audio-related data. Then, when the data is needed, for example in the rendering pipeline, a DMA circuit is used to transfer the data to a main memory where it becomes available to the component that needs it. The data transferred to the main memory may be decompressed, if appropriate.

Thus, in accordance with one aspect of the present invention, a video game system includes an audio digital signal processor, a main memory and an audio memory separate from the main memory and storing audio-related data for processing by the audio digital signal processor. Memory access circuitry reads non-audio-related data stored on a mass storage device and writes the non-audio-related data to the audio memory. The non-audio-related data is later read from the audio memory and written to the main memory without being processed by the audio digital signal processor.

In accordance with another aspect of the present invention, a method of accessing non-audio-related data stored on a mass storage device includes providing an audio memory separate from a main memory and storing therein audio-related data for processing by an audio digital signal processor. Non-audio related data is read from the mass storage device and written to the audio memory. The non-audio-related data is later read from the audio memory and written to a main memory without being processed by the audio digital signal processor.

BRIEF DESCRIPTION OF THE DRAWINGS

These and other features and advantages provided by the invention will be better and more completely understood by referring to the following detailed description of presently preferred embodiments in conjunction with the drawings, of which.

DETAILED DESCRIPTION OF EXAMPLE EMBODIMENTS OF THE INVENTION

Figure 1:
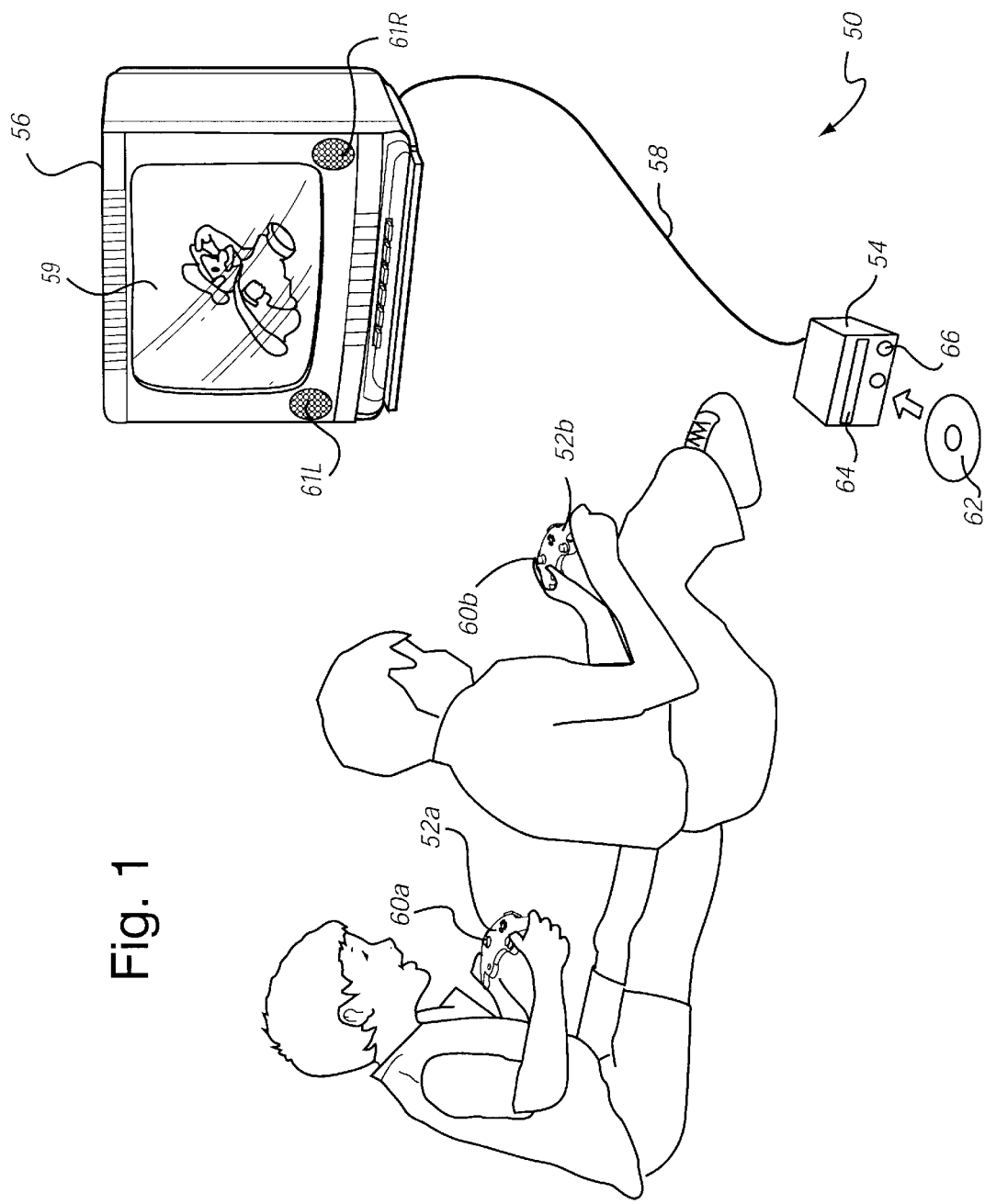
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
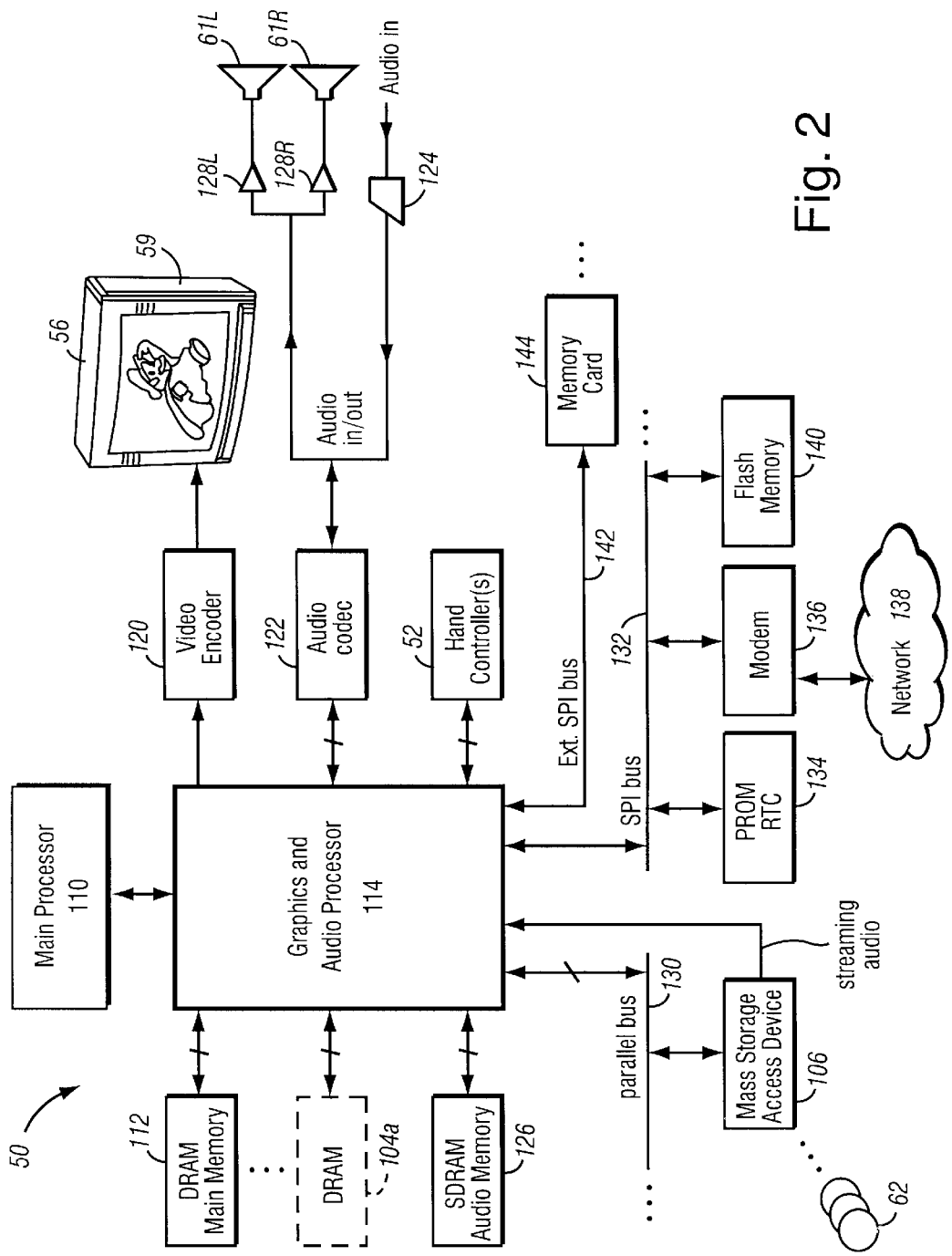
FIG. 2 is a block diagram of the FIG. 1 example computer graphics system.

FIG. 2 shows a block diagram of example components of system 50. The primary components include:

- a main processor (CPU) 110,
- a main memory 112, and
- a graphics and audio processor 114.

In this example, main processor 110 (e.g., an enhanced IBM Power PC 750) receives inputs from handheld controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

- a programmable read-only memory (PROM) and/or real time clock (RTC) 134,
- a modem 136 or other networking interface (which may in turn connect system 50 to a telecommunications network 138 such as the Internet or other digital network from/to which program instructions and/or data can be downloaded or uploaded), and
- a flash memory 140.

Example Graphics and Audio Processor

Figure 3:
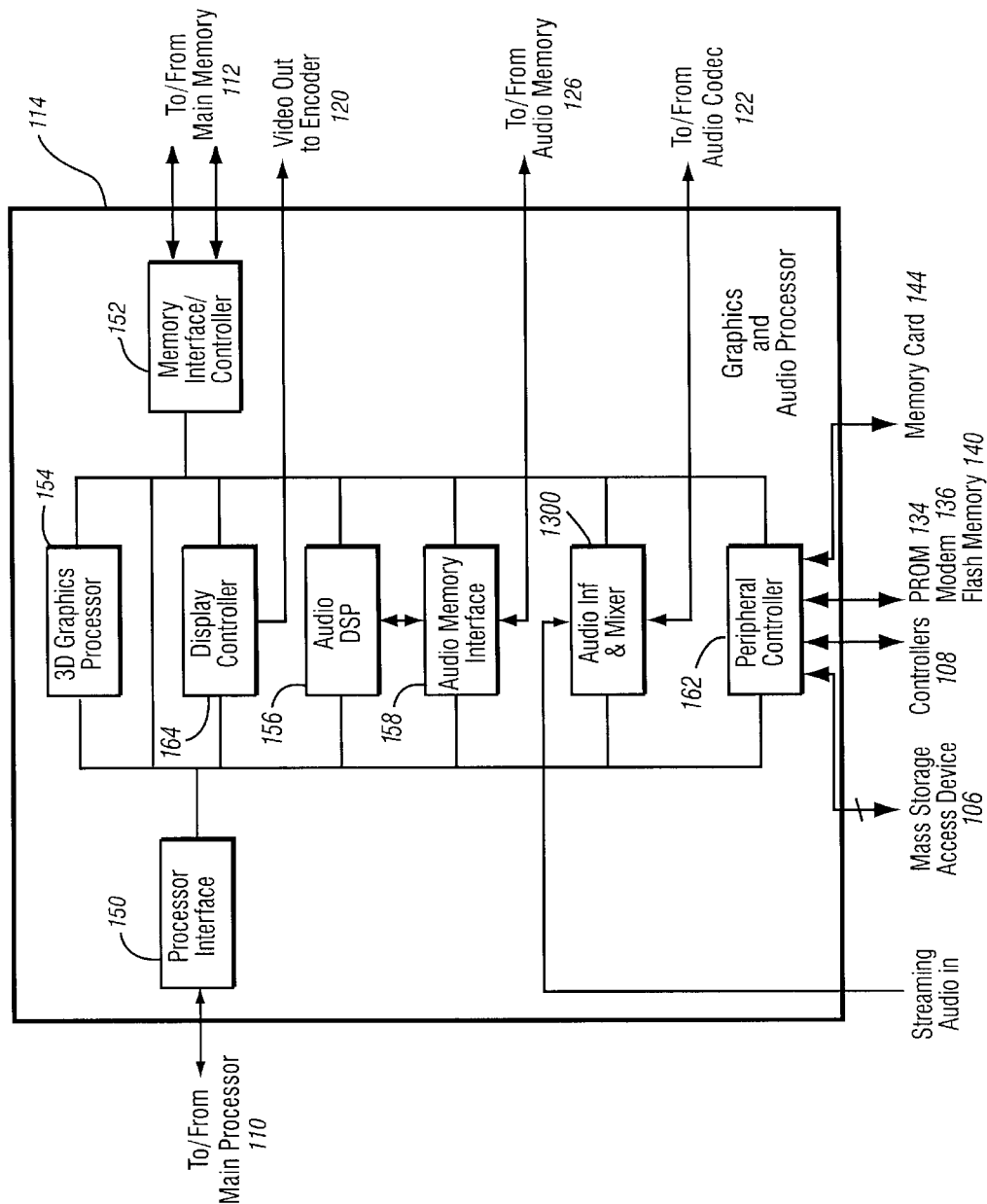
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

a processor interface 150, a memory interface/controller 152, a 3D graphics processor 154, an audio digital signal processor (DSP) 156, an audio memory interface 158, an audio interface and mixer 1300, a peripheral controller 162, and a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 1300 interfaces with audio code 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
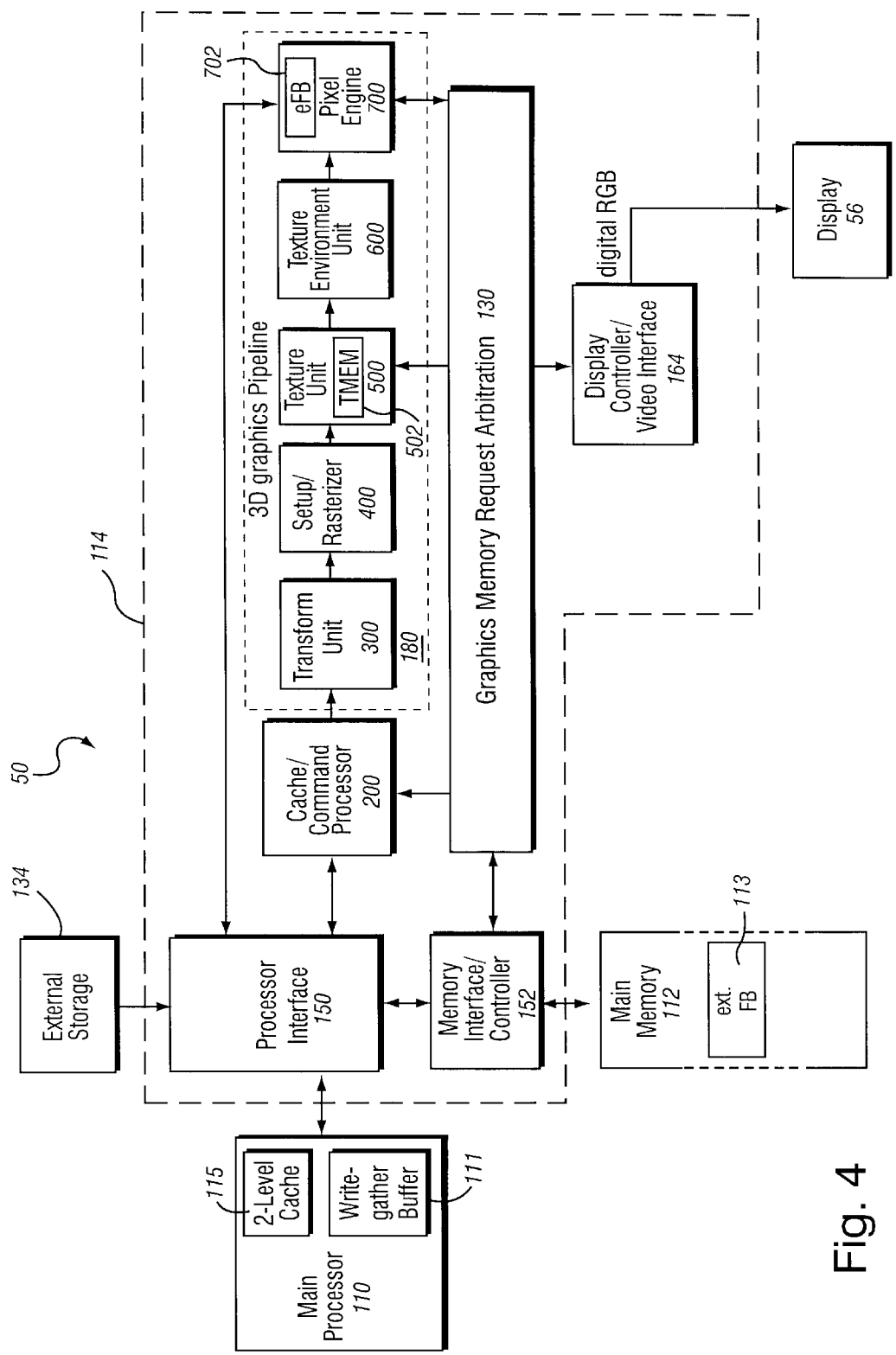
FIG. 4 is a block diagram of the example 3D graphics processor shown in FIG. 3.

FIG. 4 shows a graphics processing system including a more detailed view of an exemplary FIG. 3 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112 via memory controller 152. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

Figure 5:
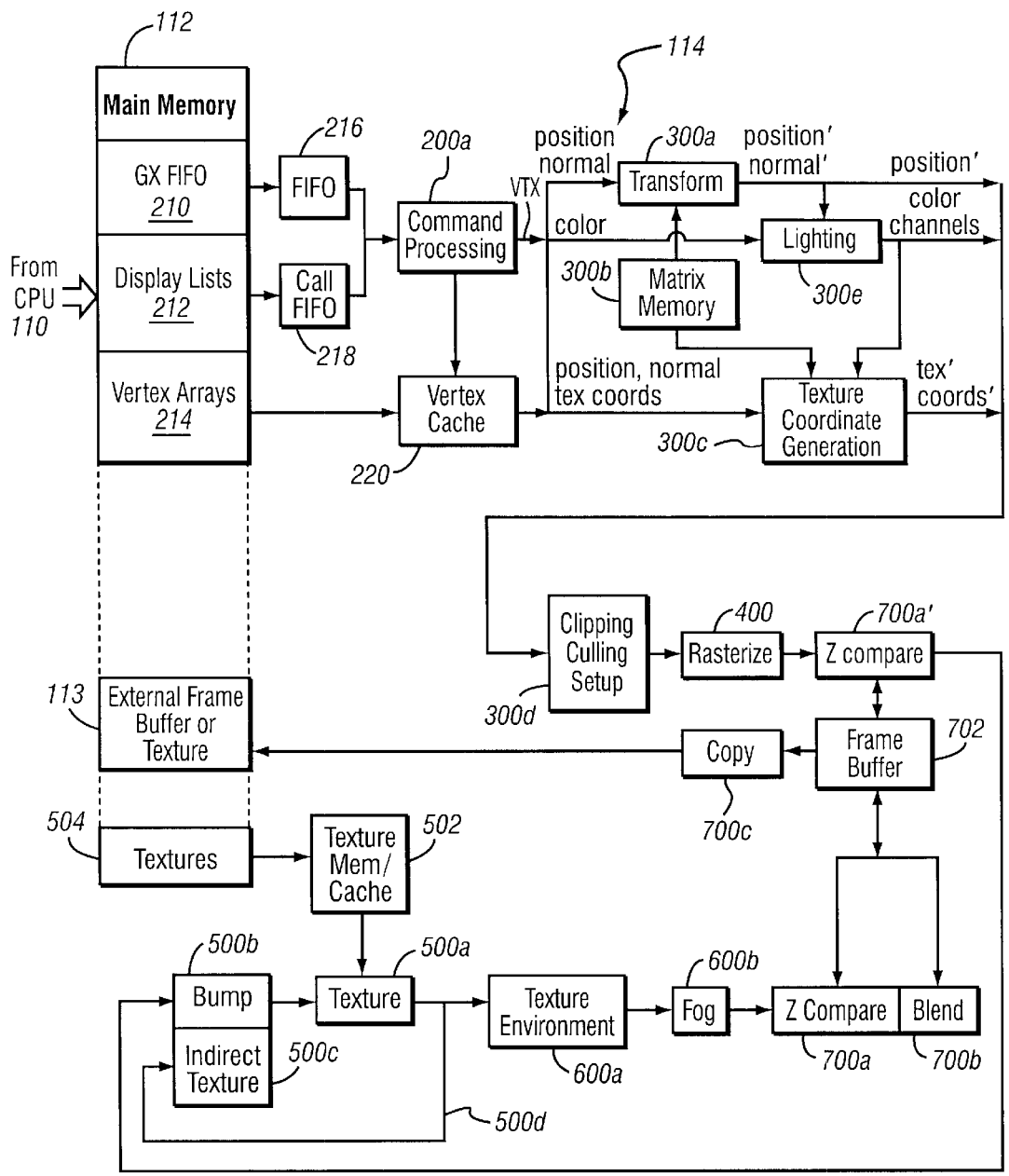
FIG. 5 is an example logical flow diagram of the FIG. 4 graphics and audio processor.

FIG. 5 is a block logical flow diagram portraying illustrative processing performed using graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

a transform unit 300, a setup/rasterizer 400, a texture unit 500, a texture environment unit 600, and a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit that receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500a) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500b), and indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700*a*) and pixel blending (700*b*). In this example, pixel engine 700 stores data into an embedded (on-chip) frame buffer memory 702. Graphics pipeline 180 may include one or more embedded DRAM memories 702 to store frame buffer and/or texture information locally. Z compares 700*a'* can also be performed at an earlier stage in the graphics pipeline 180 depending on the rendering mode currently in effect (e.g., z compares can be performed earlier if alpha blending is not required). The pixel engine 700 includes a copy operation 700*c* that periodically writes on-chip frame buffer 702 to memory portion 113 of main memory 112 for access by display/video interface unit 164. This copy operation 700*c* can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 56.

Example Audio System

Audio DSP 156 performs pitch modulation and the mixing of voices and effects data. Audio DSP 156 is augmented by a large quantity (e.g., 16 MB or more) of audio memory 126 (auxiliary RAM—ARAM) that may be used to store audio samples. Audio is routed to speakers 61L and 61R via audio codec 122 which includes a digital-to-analog converter. Streaming audio from mass storage device 62 provides an efficient method for reproducing high-fidelity audio during game runtime.

Figure 6:
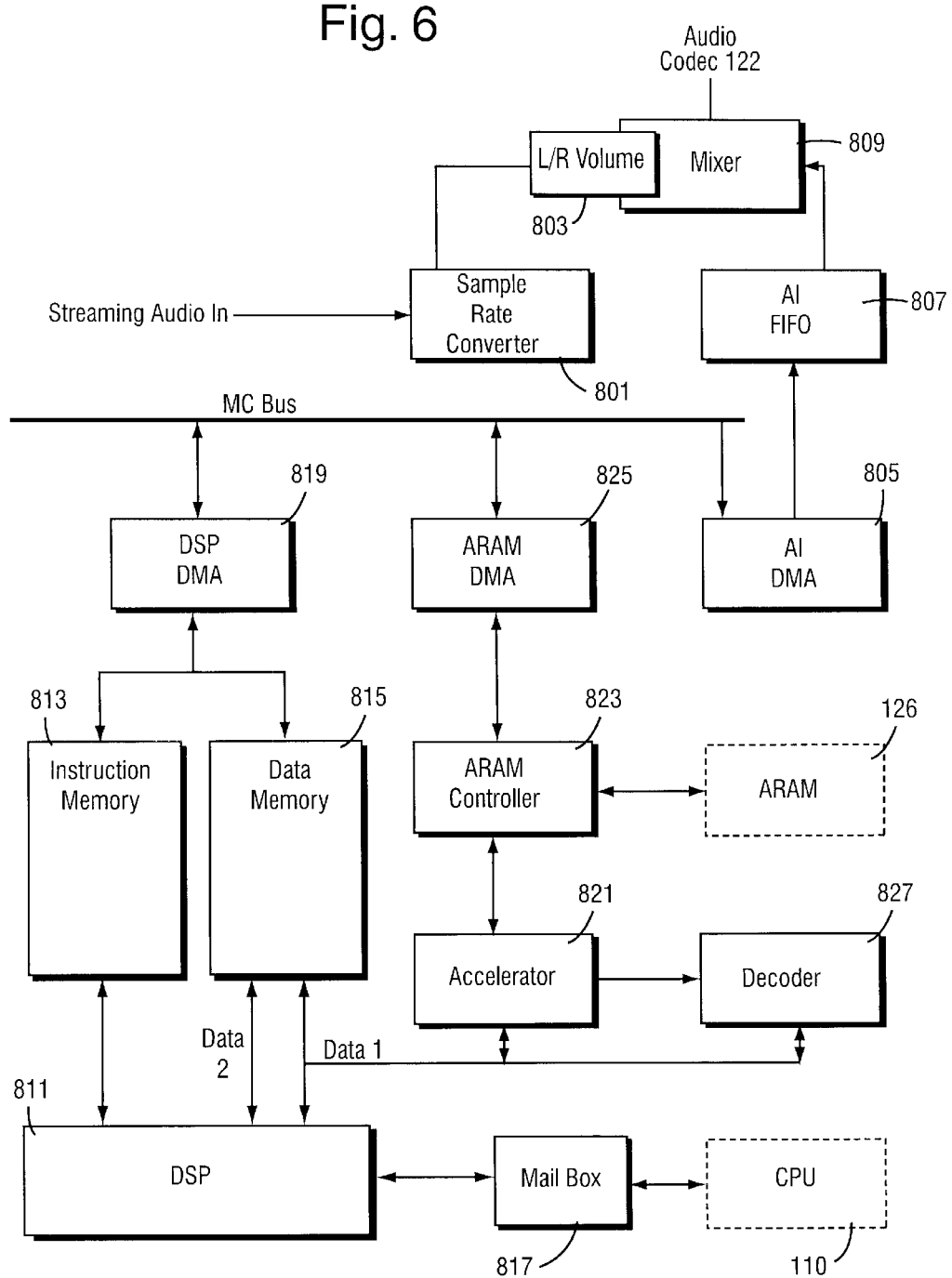
FIG. 6 is a more detailed block diagram of audio DSP 156, audio memory interface 158 and audio interface and mixer 160 shown in FIG. 3.

FIG. 6 is a more detailed block diagram of audio DSP 156, audio memory interface 158 and audio interface and mixer 160 shown in FIG. 3. A sample rate converter 801 samples streaming audio (which may be from mass storage device 62) at either 48 kHz or 32 kHz and L/R volume control 803 controls the left- and right-channel volume levels of the sampled audio. The streaming audio bypasses main memory 112 entirely, thereby conserving memory and processor bandwidth. In cases in which audio data on mass storage device 62 is encoded, for example, in ADPCM format, mass storage access device 106 automatically decodes the ADPCM data into PCM samples (e.g., 16 bits) for supply to sample rate converter 801.

A DMA channel 805 enables the transfer of data from an arbitrary location in main memory 112 to FIFO buffer 807. Mixer 809 mixes the outputs of sample rate converter 801 and FIFO buffer 807 and the result is output to audio codec 122. The sampling rate of audio codec 122 is, for example, 48 kHz and audio codec 122 may be a standard SigmaDelta codec for converting stereo, 16-bit PCM into an analog signal.

DSP core 811 has a 100 MHz instruction clock and uses 16-bit data words and addressing. DSP core 811 uses a word (16-bit) addressable instruction memory 813 that includes a RAM area (e.g., 8 kbyte) and a ROM area (e.g., 8 kbyte) and a word addressable data memory 815 that includes a RAM area (e.g., 8 kbyte) and a ROM area (e.g., 4 kbyte). A DSP DMA 819 is provided to transfer data from/to main memory 112 to/from the DSP data/instruction RAM areas, or from the DSP data/instruction ROM areas to main memory 112. There are two requesters of access to instruction memory 813: DSP DMA 819 and DSP 811. The instruction RAM area can be read/write by DSP DMA 819 and can be read only by DSP 811. The instruction ROM area can only be read by DSP 811. There are three requesters of access to data memory 815: DSP DMA 819, data bus 1 and data bus 2. Mail box registers 817 are provided for communication with the main processor 110. Mail box registers 817 may include a first mail box register for communications from main processor 110 to DSP core 811 and a second mail box register for communications from DSP core 811 to main processor 110. Each register is, for example, 32-bits wide. An accelerator 821 is usable instead of DSP core 811 to read from and write to audio memory 126. A memory controller 823 is provided for audio memory 126 and is operative, among other things, to arbitrate requests for audio memory access between DSP core 811 and a dedicated DMA channel 825 controlled by main processor 110 for data transactions between audio memory 126 and main memory 112. Generally, data transactions between audio memory 126 and DSP data memory 815 have priority over DMA channel 825. A decoder 827 decodes audio samples supplied thereto. Audio memory 126 is intended primarily for the storage of audio-related data and may comprise 16 MB of SDRAM (expandable up to a total of 48 MB).

To help reduce audio data storage requirements, various compression and decompression schemes may be utilized. ADCPM refers to adaptive differential PCM. This scheme may be used to compress/decompress sounds generated by the audio subsystem described above and to compress/decompress sounds on mass storage device 62. Various ADPCM algorithms exist and it is not necessary that the same algorithm be used for the sounds generated by the audio subsystem and the sounds on mass storage device 62. Decoder 827 provides runtime ADPCM decompression of sound data generated by the audio subsystem, and mass storage access device 106 provides runtime ADPCM decompression of sound data from mass storage device 62. An 8-bit PCM compression/decompression scheme may also be used for sound data generated by the audio subsystem. Thus, decoder 827 also provides runtime decompression of 8-bit PCM-compressed sound data. Of course, the mentioned compression/decompression schemes are provided by way of illustration, not limitation.

Figure 7A:
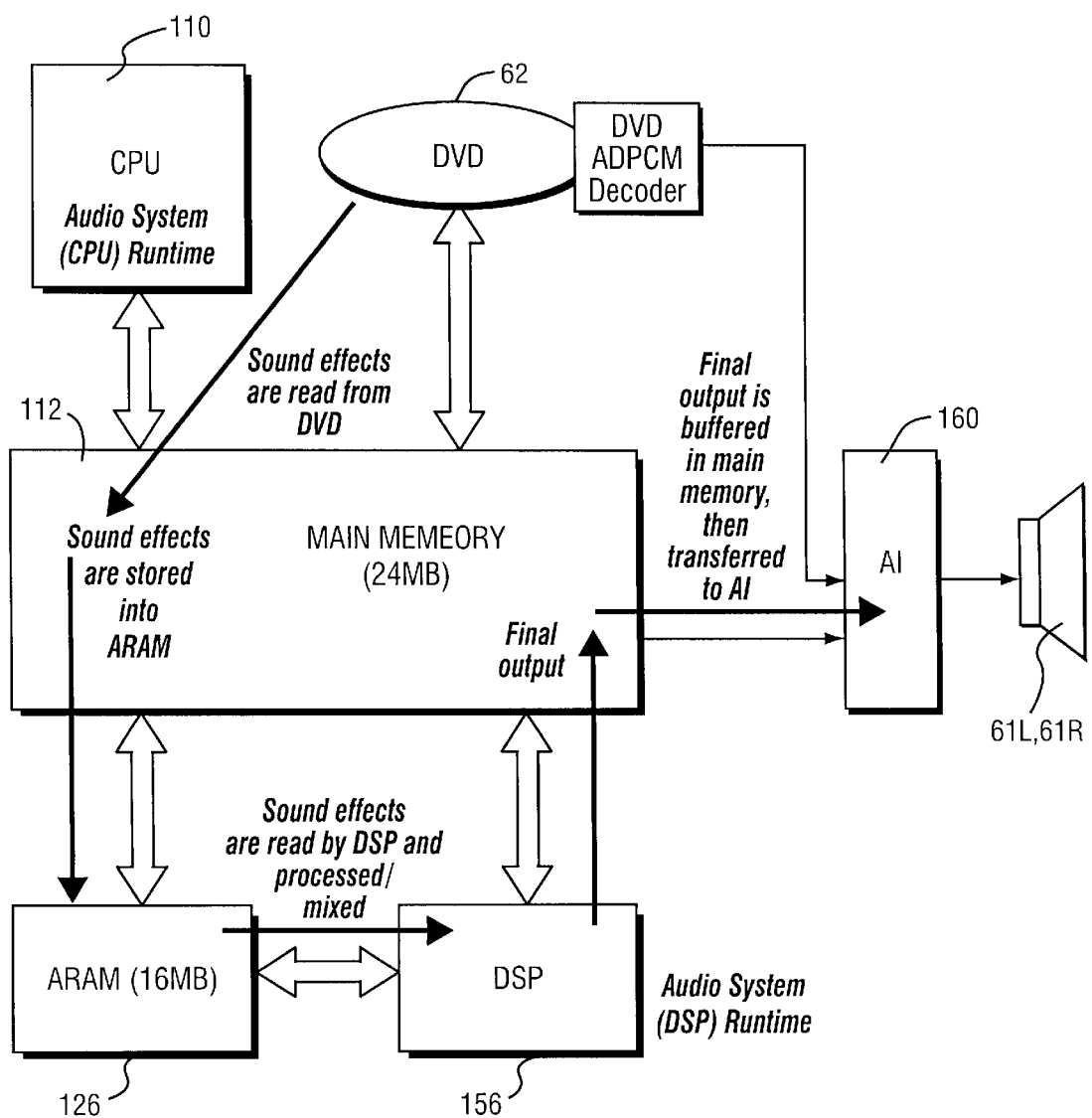
FIGS. 7A and 7B illustrate data flow and control flow, respectively, for reproducing sounds.
Figure 7B:
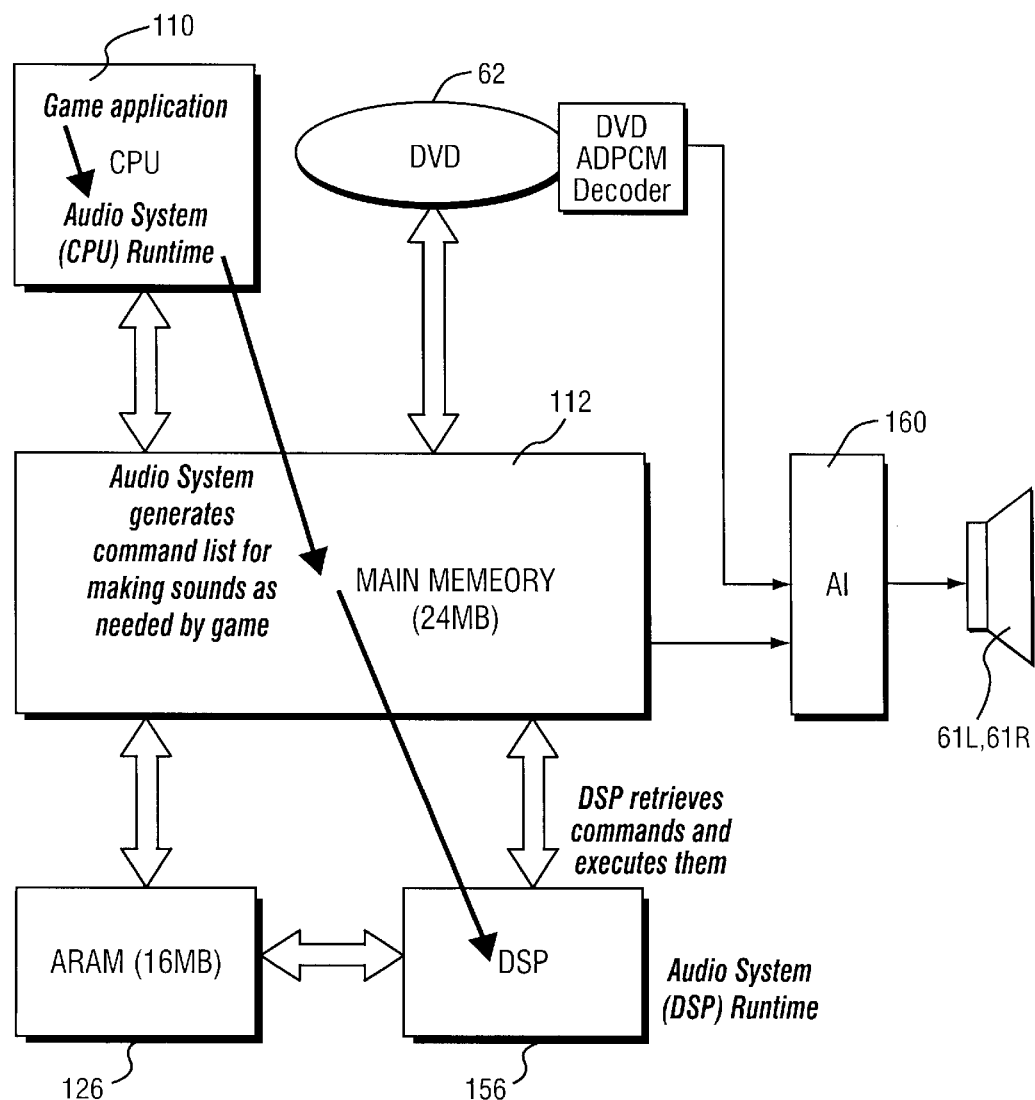

During system initialization, a runtime audio library is downloaded to audio DSP 156. This audio library is used by audio DSP 156 to process and mix voices in accordance with commands in a command list generated by main processor 110. The command list is stored in main memory 112. Audio DSP 156 retrieves the commands from main memory and executes them in accordance with the runtime audio library downloaded thereto. FIGS. 7A and 7B illustrate data flow and control flow, respectively, for reproducing sounds. As shown in FIG. 7A, sound samples are read from mass storage device 62 into main memory 112 via peripheral (I/O) controller 162 and from main memory 112 into audio memory 126 via ARAM DMA 825. The sound samples are read by DSP core 811 via accelerator 821 and DSP core 811 processes/mixes the sound samples. The processed/mixed sound samples are buffered in main memory 112 and then transferred to audio interface FIFO 807 for output to speakers 61L, 61R via audio codec 122. As shown in FIG. 7B, the game application ultimately dictates the need for sound. The game application makes a call to the audio system (main processor) runtime application which generates a command list for audio DSP 156. In executing the command list, audio DSP 156 retrieves the appropriate sound sample and processes it as needed.

The data and control flow for music synthesis is similar to that for sound samples shown in FIG. 7A. The instrument wavetable from mass storage device 62 is stored in audio memory 126 via main memory 112. Audio DSP 156, upon receiving commands generated by the audio system (main processor) run time application, retrieves the necessary instrument samples, processes and mixes them, and stores the result in main memory 112. From there, the result is transferred to audio interface FIFO 807 for output to speakers 61L, 61R via audio codec 122. The commands generated by the audio system (main processor) run time application are driven by the music score which is read from mass storage device 62 into main memory 112 and which is processed and sequenced by the audio system (main processor) run time application according to the demands of the game.

The audio system (main processor) run time application may also manage the playback and mixing of audio tracks to provide software streaming. Software streaming allows the simultaneous playback of one or more audio tracks, which provides a degree of interactivity. The game may, for example, fade from one track into another to influence the player's mood. In general, the different audio tracks are buffered in audio memory 126 as individual sound samples. Audio DSP 156 may then retrieve the tracks and mix them just as it would any other voice.

The audio system permits placing of sound emitters in three-dimensional space. This is achieved with the following features:

Volume and panning control

Pitch modulation (for Doppler effect)

Initial time delay (phase shift between left and right channels)

FIR filter (for HRTF and environmental effects)

Together these features provide a powerful means of generating psycho-acoustic three-dimensional sound effects with a pair of speakers.

Figure 8:
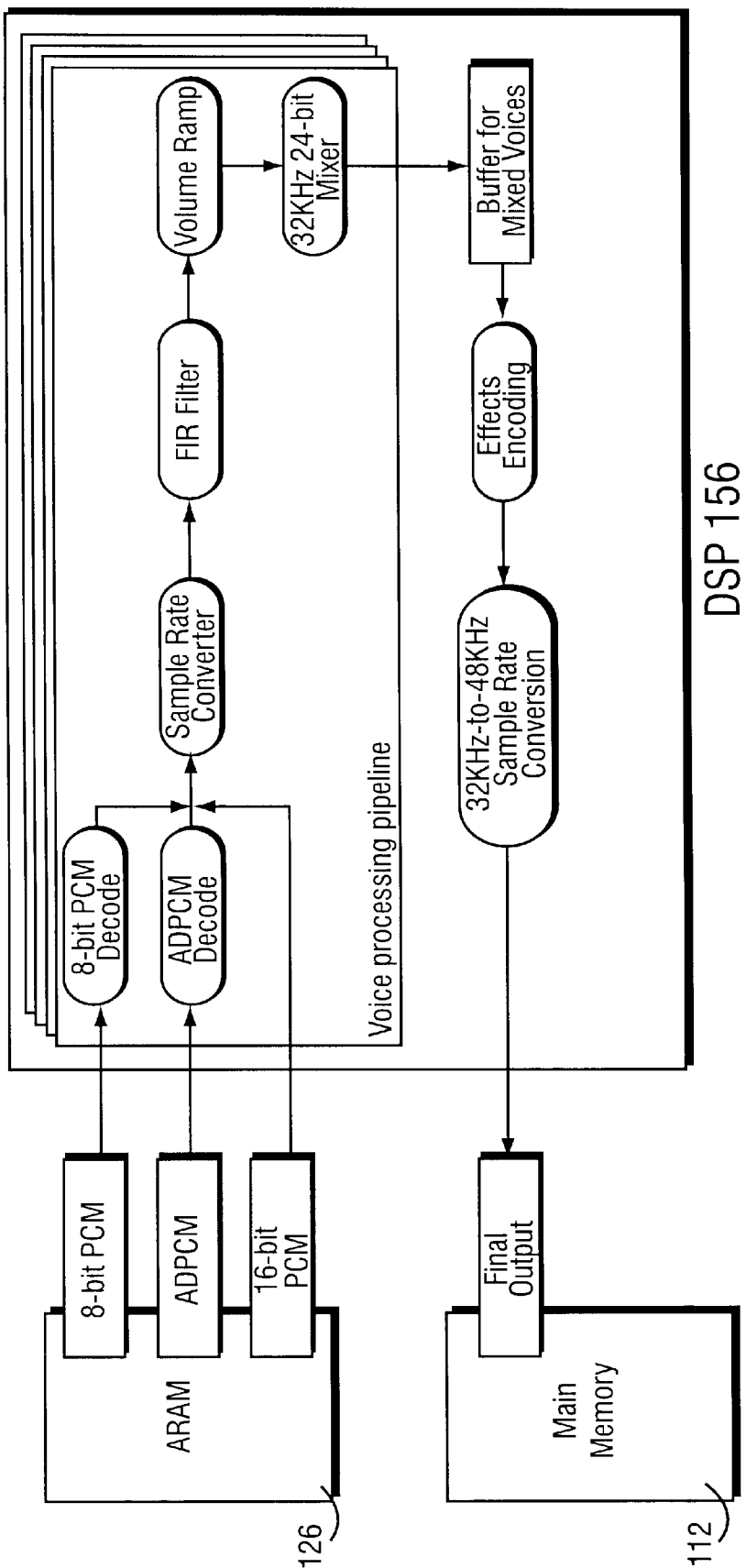
FIG. 8 shows processing steps of audio DSP 156.

The voice processing pipeline is shown in FIG. 8:

1. Samples are read from audio memory 126 by audio DSP 156.
2. ADPCM and 8-bit PCM samples from audio memory 126 are decoded and the decoded samples are supplied to a first sample rate converter.
3. 16-bit PCM samples from audio memory 126 are passed directly to the first sample rate converter.
4. The sample rate converter adjusts the pitch of the incoming samples.
5. An FIR filter applies an optional, user-defined filter to the samples.
6. A volume ramp applies a volume ramp across samples for volume envelope articulation.
7. A mixer mixes the samples at a 32 kHz sampling rate with 24-bit precision.

Steps 1–7 are repeated for each voice. When all of the voices have been processed and accumulated in the mixer buffer, the following steps occur:

1. Dolby surround and main processor-based effects (such as reverb or chorus) are applied to the mixed voices.
2. The samples are truncated from 24-bit to 16-bit precision, the data is converted to a 48 kHz sample rate for output by the audio codec 122, and the result is output to main memory 112.

Figure 9:
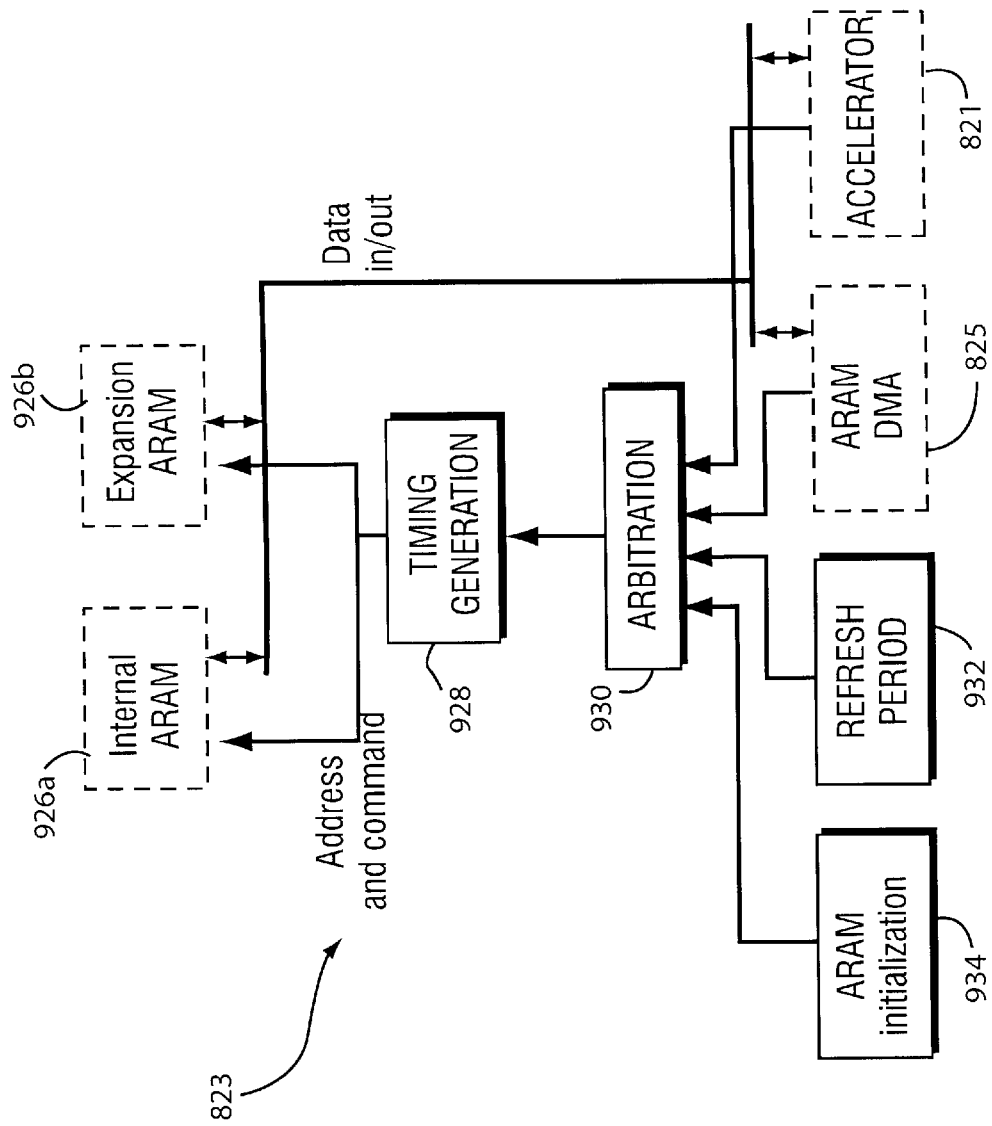
FIG. 9 is a detailed block diagram of memory controller 823 shown in FIG. 6.

FIG. 9 is a detailed block diagram of audio memory controller 823. Audio memory controller 823 performs the following functions:

After reset, provides audio memory initial timing generation to stabilize audio memory (includes audio memory mode setting);

Generates audio memory refresh cycles; and

Accepts read/write requests of DMA 825 and accelerator 821 and then generates access timing to audio memory 126.

A timing generation circuit 928 generates the access timing. In the example system, there are up to two memory devices that make up audio memory 126. The first is internal audio memory 926a and has a maximum size of 8 Mbyte. The second is expansion audio memory 926b and has a maximum size of 32 Mbyte. The addresses of internal audio memory 926a start from 0, and the addresses of expansion audio memory 926b are cascaded onto the ending address of the internal audio memory. Thus, the address spaces of internal audio memory 926a and expansion audio memory 926b are consecutive and the starting address of expansion audio memory 926b depends on the size of internal audio memory 926a. The mode setting and refresh cycles of internal audio memory 926a and expansion audio memory 926b are active simultaneously.

After a reset, audio memory controller 823 initializes audio memory 126 (as represented by "ARAM initialization" 934 in FIG. 9). During initialization, controller 823 masks any access to audio memory 126; after initialization, audio memory 126 is freely accessible. A flag ARAM_NORM may be set as an indication that initialization has been performed. As mentioned above, the initialization includes audio memory mode setting. The following settings may be set in an audio memory mode register:

Burst length (e.g., 2 bytes),

Addressing mode (e.g., sequential),

CAS latency (2 or 3—programmed by main processor 110), and

Write mode (burst read and burst write).

Audio memory controller 823 initializes internal audio memory 926a and expansion audio memory 926b simultaneously. Main processor 110 programs CAS latency before initialization is finished. If CAS latency is not programmed by main processor 110, the reset default CAS=3 is used to access audio memory 126.

After initialization, audio memory controller 823 determines the sizes of internal audio memory 926a and expansion audio memory 926b.

Except for a chip select signal, internal audio memory 926a and expansion audio memory 926b share the same address bus, data bus and control signals. During operation, an arbitration unit 930 generates access timing for three requesters:

DMA 825,

Accelerator 821, and

Refresh counter 932.

The priority among these requesters is as follows:

Refresh counter 932>accelerator 821>DMA 825

The auto refresh period is programmable and audio memory controller 823 provides refresh cycles to internal audio memory 926a and expansion audio memory 926b at the same time.

The following DSP-programmed bit can be used to mask access to audio memory 126 by DMA 825:

AMDM:Ara__M-Dma request Mask DSPaddress: 0×FFEF

| Bits | Name | Type | Reset | Description |
|---|---|---|---|---|
| 15 ... 1 | | R | 0x0 | Reserved |
| 0 | DMA request mask | R/W | 0x0 | 0: DMA request ARAM is unmasked<br>1: DMA request ARAM is masked |

If bit 0 of AMDM is set, access to audio memory 126 is dedicated to accelerator 821. If bit 0 of AMDM is clear, the following process occurs. Typically, DMA 825 accesses audio memory 126 via a plurality (e.g., 16) of read/write commands. If accelerator 821 needs to access audio memory 126 during this time, audio memory controller 823 determines whether both are attempting to access the same bank of audio memory 126. If so, audio memory controller 823 terminates (precharges) access by DMA 825 and transfers access to accelerator 821. After accelerator 821 finishes, audio memory controller 823 transfers access back to DMA 825 and DMA 825 executes (activate first) the rest of its read/write commands.

If accelerator 821 and DMA 825 are accessing different banks, an interleaved bank access scheme is utilized to realize better performance on access transfer between accelerator 821 and DMA 825. In this scheme, audio memory controller 823 does not precharge (terminate) the DMA bank, leaving it on waiting. Access to audio memory 126 is then transferred to accelerator 821. After accelerator 821 finishes its access of audio memory 126, audio memory controller 823 executes (no need to activate first) the rest of the read/write commands of DMA 825.

If access of audio memory 126 crosses a 512 byte boundary (different row), audio memory controller 823 precharges the current row to end access and activates the next row to start access. This increases the number of cycles to read/write data. The interleaved bank scheme described above is preferably not provided for DMA-access-cross-row or accelerator-access-cross-row.

Figure 10A:
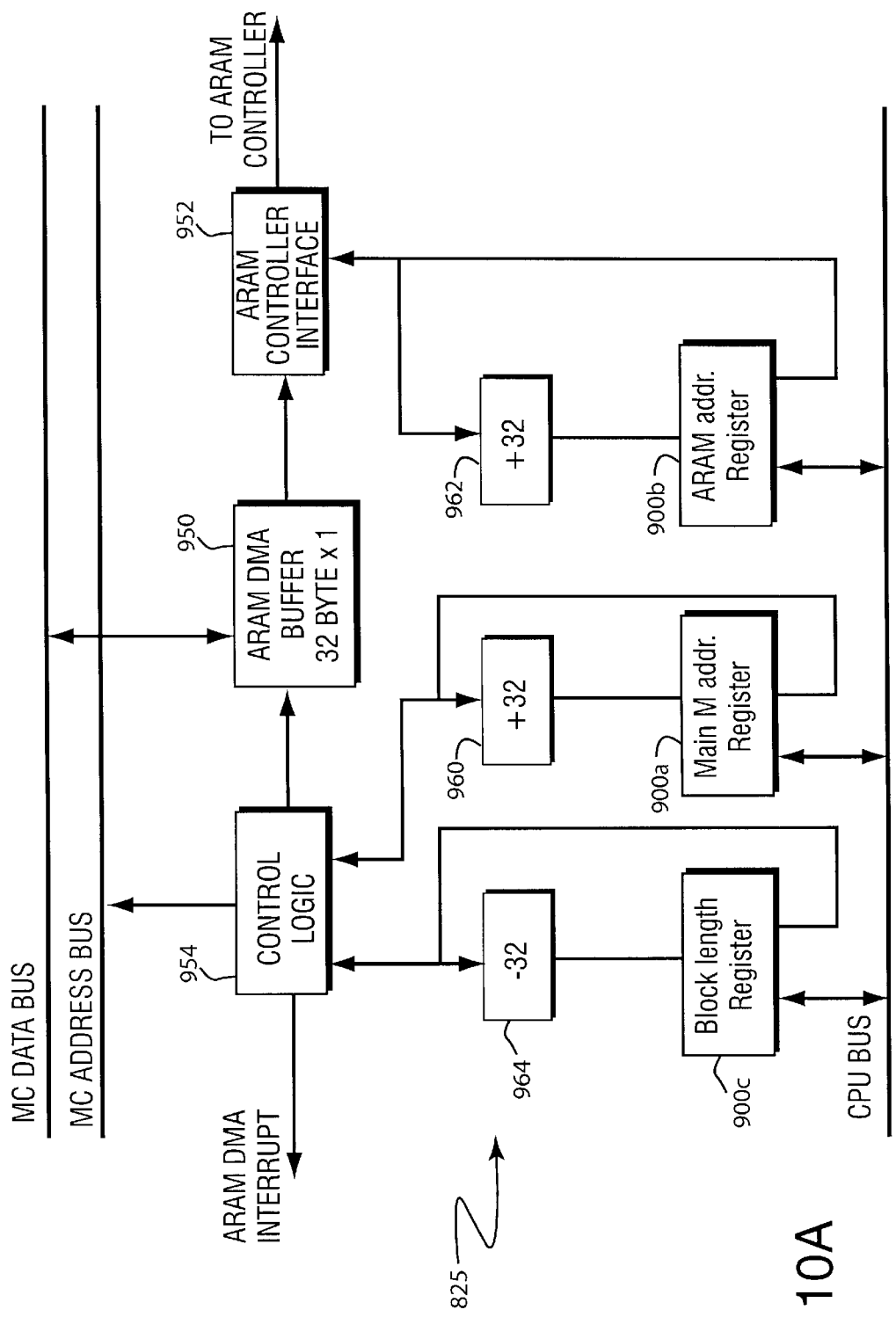
FIG. 10A is a detailed block diagram of audio memory DMA 825 shown in FIG. 6.

The details of the audio memory DMA 825 are shown in FIG. 10A. Audio memory DMA 825 includes three registers 900a–900c that are used to define main memory starting address, audio memory starting address, and the block length and the direction of the DMA transfer, respectively. Main processor 110 programs these registers. The registers are 32-bits wide and the DMA transfer direction is specified by bit 15 of the high word of the block length register. The starting address of each side (i.e., main memory 112, audio memory 126) is located at 32 byte boundary and the block length is a multiple of 32 bytes. During DMA transfer, these registers are modified by each memory controller block access. There is a one memory controller size (32 byte) data buffer 950 built into the audio memory DMA to bridge the unequal bandwidth memories.

The operation flow of main memory 110 to audio memory 126 includes the following steps:

1. A write to the low word of block length register 900c triggers DMA 825 as ready to transfer data.
2. DMA 825 sends a read request to memory controller 152 (FIG. 3) and then waits for 32 byte data coming to DMA data buffer 950.
3. Once the 32 byte data is moved into data buffer 950, DMA 825 sends a write request to arbitration circuit 930 (see FIG. 9) and waits for transfer. Main memory address register 900a is also increased by 32 by address incrementing circuit 960.
4. If DMA 825 is granted access to audio memory 126 by arbitration circuit 930, a write command is sent to audio memory 126 and data starts to move from DMA data buffer 950 to audio memory 126 byte by byte, until 32 bytes have been moved (buffer empty). The audio memory address is increased by 32 by audio address incrementing circuit 962 and the block length is decreased by 32 by block length decrementing circuit 964.
5. Steps 2 through 4 are repeated until the block length reaches 0. At this point, DMA 825 stops and control logic 954 sets up a flag and generates an interrupt to main processor 110. The interrupt is maskable.

The operation flow of audio memory 126 to main memory 110 includes the following steps:

1. A write to the low word of block length register triggers DMA 825 ready to transfer data.
2. DMA 825 sends a read request to arbitration circuit 930 (see FIG. 9) and then waits for 32 byte data.
3. If DMA 825 is granted access to audio memory 126 by arbitration circuit 930, a read command is sent to audio memory 126 and data starts to move from audio memory 126 to DMA data buffer 950 byte by byte until 32 bytes have been moved into the data buffer. The audio memory address in audio memory address register 900b is then increased by 32 by audio address incrementing circuit 962.
4. Once 32 byte data is moved into DMA data buffer 950, DMA 825 sends a write request to memory controller 152. The 32 byte data is then moved from DMA data buffer 950 to the memory controller bus. After this, the address of main memory 110 is increased by 32 by main memory address incrementing circuit 960 and the block length is decreased by 32 by clock length decrementing circuit 964.
5. Steps 2 through 4 are repeated till the block length reaches 0. At this point, DMA 825 stops and control logic 954 sets up a flag and generates an interrupt to main processor 110. The interrupt is maskable.

Arbitration is performed before each 32 byte transfer. The memory controller bus arbitration priority is as follows:

AI DMA 805>DSP DMA 819>ARAM DMA 825

Figure 10B:
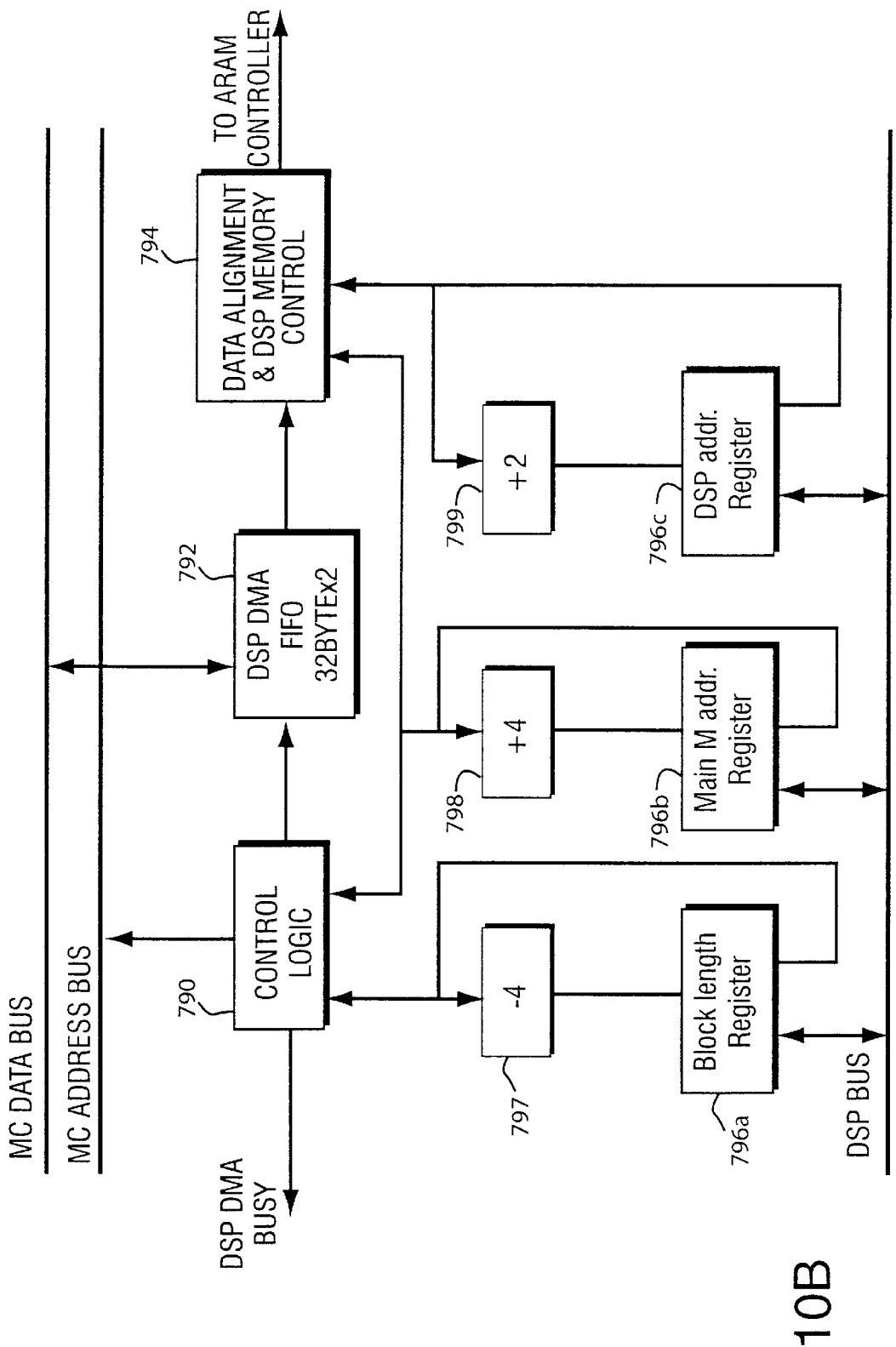
FIG. 10B is a detailed block diagram of DSP DMA 819 shown in FIG. 6.

FIG. 10B is a block diagram illustrating the details of DSP DMA 819. As mentioned above, DSP DMA 819 functions to transfer data from/to main memory 112 to/from the DSP data/instruction RAM areas or from the DSP data/instruction ROM areas to main memory 112. DSP DMA 819 includes three registers 796a–796c that are used to define a block length, a main memory address and a DSP memory address. A 2×32 byte FIFO 792 is used for the data transfer and a 64-bit data bus provides high speed data transfer between FIFO 792 and audio memory 126. The main memory starting address is located at a 4 byte boundary and the DSP starting address is located at a 2 word (32 bit) boundary. The block length is a multiple of 4 bytes. A control register of DSP DMA 819 includes a first bit that specifies the DMA transfer direction and a second bit that specifies whether the data memory or the instruction memory is involved in the DMA transfer. The control register also includes a DSP DMA busy bit for providing DSP DMA status via control logic 790. The busy bit is set once the DSP DMA is enabled and is cleared when the block length in the block length register equals 0.

DSP DMA 819 is enabled by DSP 811 writing to block length register 796a. Once DSP DMA 819 is enabled, it requests that memory controller 152 grant access to main memory. When access is granted, data transfer is started. As the data transfers continues, address changing circuits 798 and 799 increase the access address of main memory 112 and DSP memory in registers 796b and 796c, respectively. The block length in register 796a is decreased in accordance with block length changing circuit 797 as the blocks are transferred. The transfer continues until the block length register is 0 and the DMA operation is then stopped. Data alignment and DSP memory control is effected by control circuit 794.

When data is transferred from main memory 112 to DSP memory, if FIFO 792 is full, DSP DMA 819 will wait for FIFO not full and then refill from main memory 112 again. If FIFO 792 is not empty, DMA will transfer data of FIFO to DSP memory until FIFO is empty. When data is transferred from DSP memory to main memory 112, if FIFO 792 is empty, DSP DMA 819 will wait for FIFO not empty and then transfer data of FIFO to main memory 112. If FIFO is not full, DMA will refill FIFO from DSP memory until FIFO is full.

Example DSP DMA relative registers are:

| Bits | Name | Type | Reset | Description |
|---|---|---|---|---|
| DSMAH: DSp dma Main memory Address High DSPaddress 0xFFCE | | | | |
| 15 . . . 10 | 6 bits of its MSBs | R | 0x0 | This register is used to specify DSP DMA main memory starting/current address from bit 31 to bit 26, and always 0 |
| 9 . . . 0 | Main memory address high word | R/W | undefined | This register is used to specify DSP DMA main memory starting/current address from bit 25 to bit 16 |
| DSMAL: DSp dma Main memory Address Low DSPaddress 0xFFCF | | | | |
| 15 . . . 2 | Main memory address | R/W | undefined | This register is used to specify DSP DMA main memory starting/current address from bit 15 to bit 2 |
| 1,0 | 2 bits of its LSBs | R | 0x0 | The main memory address of this DMA should be located at 4 byte boundary |
| DSPA: DSp dma dsP memory Address High DSPaddress 0xFFCD | | | | |
| 15 . . . 1 | DSP memory address | R/W | undefined | This register is used to specify DSP memory starting/current address from bit 15 to bit 1 |
| 0 | 1 bit of its LSBs | R | 0x0 | The DSP memory address should be located at 2 word boundary |
| DSBL: DSp dma Block Length DSPaddress 0xFFCB | | | | |
| 15 . . . 2 | block length | R/W | 0x0 | This register is used to specify DSP DMA transfer length from bit 15 to bit 2 |
| 1,0 | 2 bit of its LSBs | R | 0x0 | The transfer length is a multiple of 4 bytes |
| DSCR: DSp dma Control Register DSPaddress 0xFFC9 | | | | |
| 15 . . . 3 | | R | 0x0 | reserved |
| 2 | DSP DMA busy | R | 0x0 | Block length counter not yet zero, DMA is still busy |
| 1 | DSP source/destination | R/W | 0x0 | DMA involved DSP memory 0: DSP data memory 1: DSP instruction memory |
| 0 | transfer direction | R/W | 0x0 | 0: from main memory to DSP memory 1: from DSP memory to main memory |

In the example system, the instruction RAM is made of four copies of 256×64-bit synchronous one way dual port SRAM and the instruction ROM is made of two copies of 2048×16-bit synchronous single port ROM. The instruction RAM and the instruction ROM are independent of each other, so while a read/write DMA operation is carried out for the instruction RAM, DSP core 811 can access the instruction ROM. In addition, while DSP DMA 819 writes to the instruction RAM, DSP core 811 can read the instruction RAM. To avoid hardware conflicts, the write and read addresses for the simultaneous read/write should be different.

The data RAM is organized as 4 pages, each page being 1 kword in size. The data ROM is organized as 1 page having a size of 2 kword. One data RAM page is made up of four copies of 256×16-bit synchronous one way dual port SRAM and the data ROM page is made up of a copy of 2048×16-bit synchronous single port ROM. Each page is independent of the other pages so that each page has its own data, address busses and read, write control signals to connect to the three requesters. Data in/out ports for DSP buses 1 and 2 are 16 bits wide and the data in/out ports for DSP DMA 819 are 64 bits. In this arrangement, up to three pages can be active simultaneously for three requesters.

In this example system, each SRAM page can be accessed by one read and one write or one read and one write, but cannot be accessed by two reads or two writes. The reads could be DSP bus 1 or 2 or DSP DMA read and the writes could be DSP bus 1 or 2 or DSP DMA write. The ROM page can only be accessed by one read and the read can be a DSP bus 1 or 2 read. DSP DMA 819 cannot read the data ROM. If a page is being read by DSP DMA, DSP 811 can still write the page or read/write other pages. If a page is being written by DSP DMA 819, DSP 811 can still read the page or read/write other pages. To avoid hardware conflicts, the DSP read and the DMA write or the DSP write and DMA read should not occur on the same address location. DSP 811 is not allowed to read the page that the DMA is reading and the DSP is not allowed to write the page to which the DMA is writing.

Figure 10C:
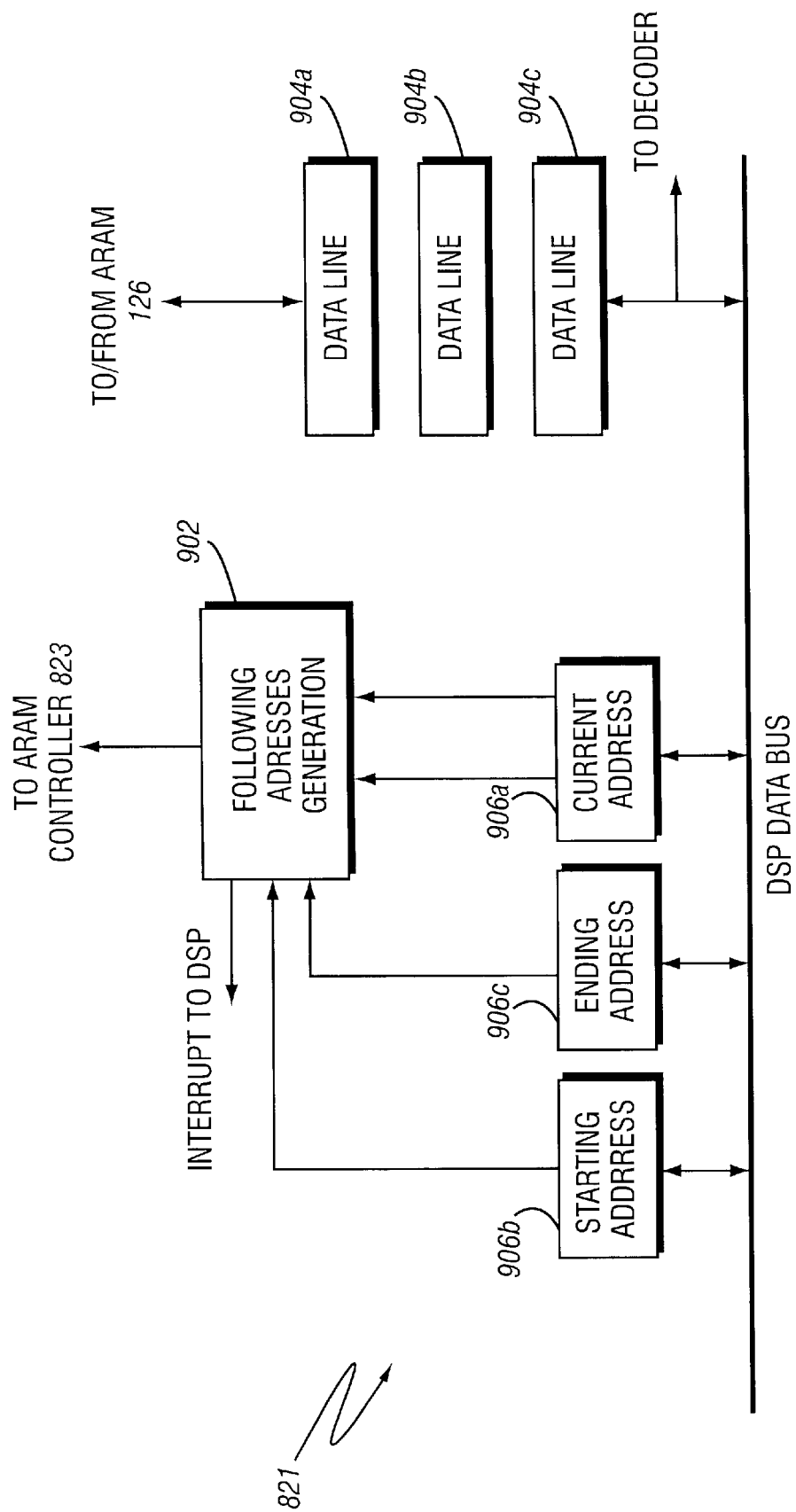
FIG. 10C is a detailed block diagram of accelerator 821 shown in FIG. 6.

FIG. 10C is a block diagram of accelerator 821. As mentioned above, accelerator 821 is used instead of DSP core 811 to read from and write to audio memory 126. Accelerator 821 includes a following addresses generating circuit 902 for automatically increasing the address or generating a wrap around address (circular addressing) for the next access. Accelerator 821 includes three data lines 904a–904c that function as pre-fetch buffers during read operations and as write buffers during write operations. As will be explained below, data lines 904a–904c hide the access latency of audio memory 126 when operations of DSP core 811 access audio memory 126. An interrupt to DSP core 811 is generated when data of the starting address is read by the DSP or when data of the ending address is written to the data lines by the DSP.

Three parameter registers (current address, starting address, ending address) 906a–906c are used to define a circular buffer in the memory space of audio memory 126. Each parameter register is 27 bits wide and can be read/write by the audio DSP. Following addresses generation circuit 902 adds "1" to the current address to obtain the next address. If the current address is equal to the ending address, then the next address is the starting address. Parameter registers 906a–906c are used for reading from and writing to audio memory 126. The relationship between the addresses and the data in the registers is as follows:

| Bits | Name | Type | Reset | Description |
|---|---|---|---|---|
| ACCAH: Accelerator aram Current Address High DSP Address:0xFFD8 | | | | |
| 15 | Direction | R/W | 0x0 | 0: accelerator read ARAM 1: accelerator write ARAM |
| 14 ... 11 | | R | 0x0 | Reserved |
| 10 ... 0 | Current address high-word | R/W | 0x0 | Bit 26 to bit 16 of ARAM current address |
| ACCAL: Accelerator aram Current Address Low DSP Address:0xFFD9 | | | | |
| 15 ... 0 | Current address low-word | R/W | 0x0 | Bit 15 to Bit 0 of ARAM current address |
| ACEAH: Accelerator aram Ending Address High DSP Address:0xFFD6 | | | | |
| 15 ... 11 | | R | 0x0 | Reserved |
| 10 ... 0 | Ending address high-word | R/W | 0x0 | Bit 26 to bit 16 of ARAM ending address |
| ACEAL: Accelerator aram Ending Address Low DSP Address:0xFFD7 | | | | |
| 15 ... 0 | Ending address low-word | R/W | 0x0 | Bit 15 to bit 0 of ARAM ending address |
| ACSAH: Accelerator aram Starting Address High DSP Address:0xFFD4 | | | | |
| 15 ... 11 | | R | 0x0 | Reserved |
| 10 ... 0 | Starting address high-word | R/W | 0x0 | Bit 26 to bit 16 of ARAM starting address |
| ACSAL: Accelerator aram Starting Address Low DSP Address:0xFFD5 | | | | |
| 15 ... 0 | Starting address low-word | R/W | 0x0 | Bit 15 to bit 0 of ARAM starting address |

Data lines 904a–904c are each 16 bits in width. For read operations, the data lines function as pre-fetch data buffers in which data is read from audio memory 126 in advance and is ready to deliver as DSP core 811 reads the data lines. For write operations, the data lines functions are temporary buffers for the data from DSP core 811 that is to be written to audio memory 126. Data lines 904a–906c are formed in a FIFO manner, the in/out port thereof being readable/writeable by DSP core 811. The addresses of the data in the data lines correspond to the current address and its two following addresses.

The audio subsystem described herein enables sound emitters to be placed in three-dimensional space and provides a powerful means of generating psycho-acoustic 3D sound effects with a pair of speakers. The audio subsystem includes an audio memory that is usable, for example, to store sound samples, instrument wave tables, audio tracks and the like read from a mass storage device such as a DVD. The samples, wave tables, tracks, etc. are subsequently read out and processed by an audio digital signal processor to produce the game audio content. This content is transferred to a main memory from where it is subsequently read out for supply to a decoder and output to speakers. The separate audio memory improves the access for the audio processing circuitry to audio data by avoiding the need to contend with other resources (e.g., the graphics subsystem) attempting to access the main system memory.

The provision of an audio memory 126 as described herein provides an opportunity to further enhance the system's ability to efficiently provide access to data to those resources that need such access. For example, a DVD has a relatively high "latency", i.e., it takes a relatively long time for data to be returned responsive to a request for the data. Therefore, it is useful to pre-fetch data such as animation data and compressed graphics data from the DVD prior to the time that the data is needed so that the data can be quickly provided to a component needing the data. The audio memory may be used as a cache for this "pre-fetched" non-audio-related data. Then, when the non-audio-related data is needed, for is example in the rendering pipeline, DMA circuit 825 is used to transfer the data to main memory 112 where it becomes available to the component that needs it. The data transferred to the main memory may be decompressed, if appropriate.

In the example system, audio memory 126 does not have a direct interface with mass storage device 62. Thus, the non-audio-related data for pre-caching is read from mass storage device 62 via peripheral controller 162 to main memory 112 and then written via ARAM DMA 825 to audio memory 126. The non-audio-related data is then later read via ARAM DMA 825 back to main memory 112 when needed, for example, in the rendering pipeline. Of course, in other implementations, audio memory 126 may be provided with a direct interface to mass storage device 62 and the non-audio-related data may be "pre-cached" in audio memory 126 without first passing through main memory 112.

The runtime audio library includes a resource management algorithm that monitors resource usage of audio DSP 156 and dynamically limits voice allocation accordingly. This prevents audio DSP 156 from becoming overburdened, which may result in corrupted audio output. Preferably, the resource management algorithm assumes worst-case memory access latencies to further ensure smooth, continuous audio. For example, up to 64 voices may be supported, depending on the mixing and processing requirement of each voice.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general-purpose digital computer such as a personal computer, which executes a software emulator program that simulates the hardware and/or firmware of system 50. The DSP processing of the above-described audio system could be emulated on a personal computer.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 11A:
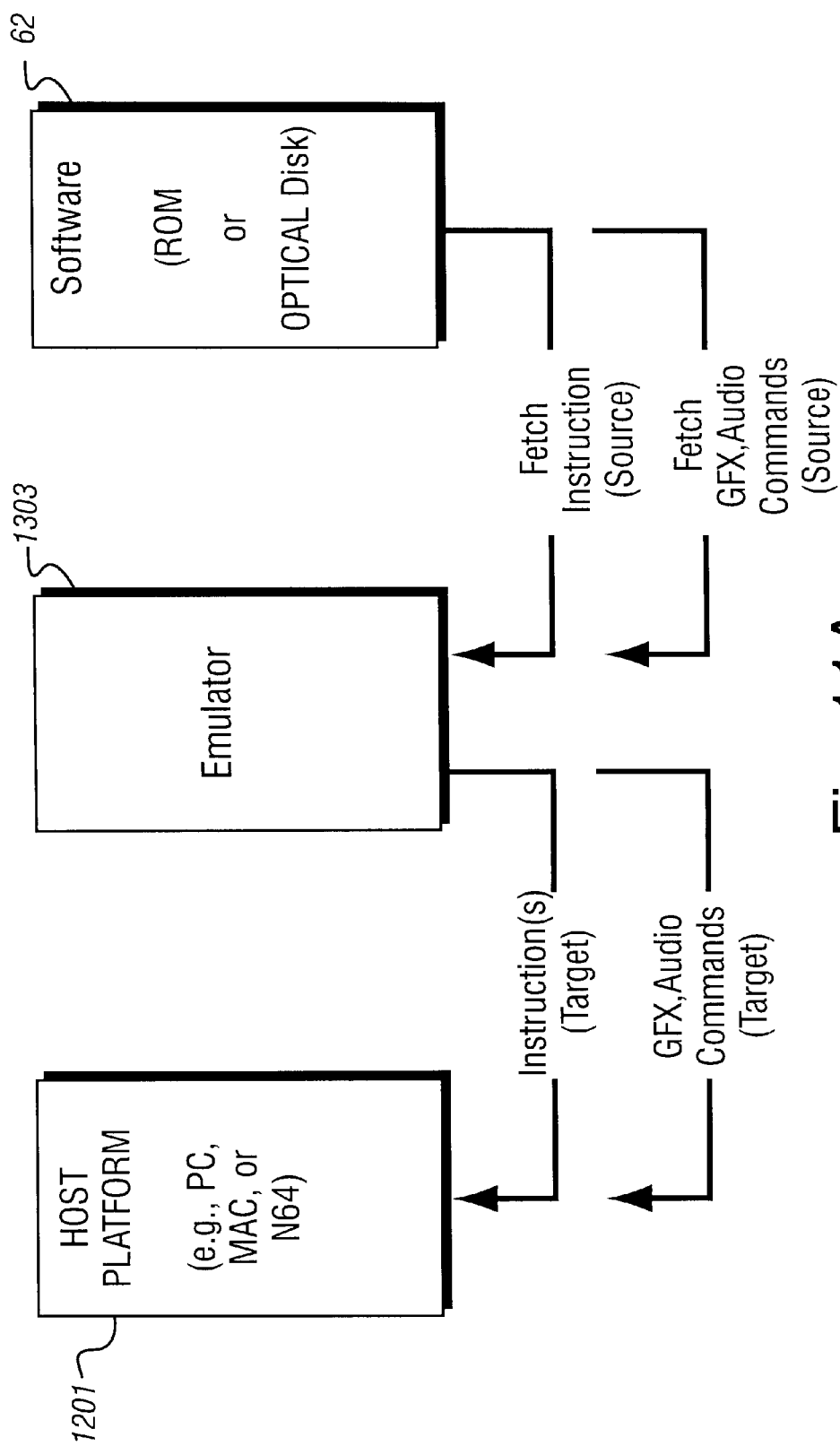
FIGS. 11A and 11B show example alternative compatible implementations.

FIG. 11A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 11B:
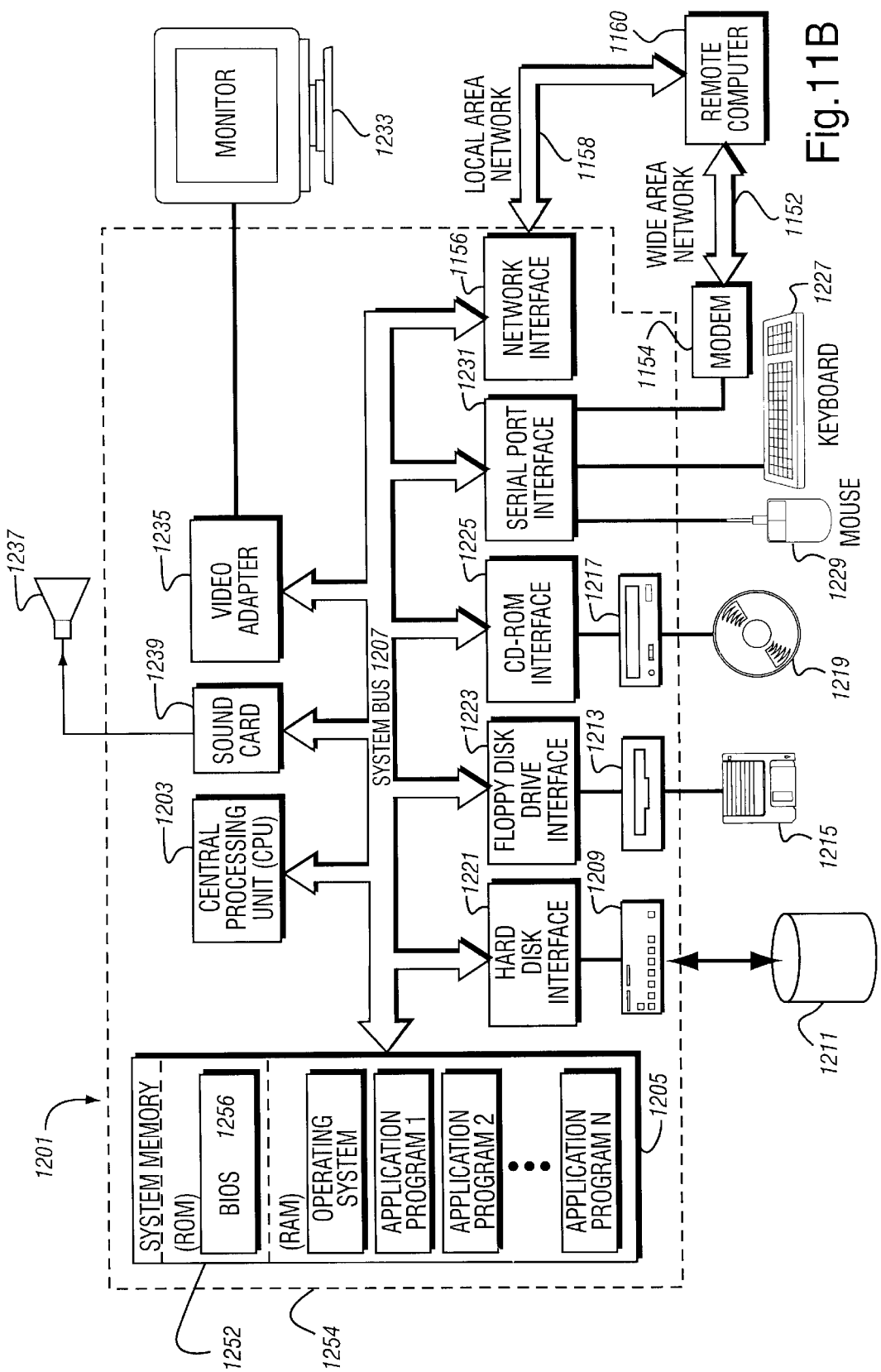

FIG. 11B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A video game system comprising:
    an audio digital signal processor;
    a main memory;
    an audio memory separate from the main memory and storing audio-related data for processing by the audio digital signal processor;
    a mass storage device; and
    circuitry for reading non-audio-related data stored on the mass storage device and writing the non-audio-related data to the audio memory, and later reading the non-audio-related data from the audio memory and writing the non-audio-related data to the main memory,
    wherein the circuitry comprises:
        a first memory address register storing a first memory address;
        a second memory address register storing a second memory address;
        a block length register for storing a block length; and
        register changing circuits for changing the data stored in the first memory address register, the second memory address register and the block length register.

2. The video game system according to claim 1, wherein the audio memory comprises internal and external memory elements.

3. The video game system according to claim 1, wherein the audio memory comprises SDRAM.

4. The video game system according to claim 1, wherein the non-audio-related data comprises graphics data.

5. The video game system according to claim 1, wherein the non-audio-related data comprises animation data.

6. The video game system according to claim 1, wherein the non-audio-related data comprises compressed geometry data.

7. The video game system according to claim 1, further comprising:
    an audio memory controller for arbitrating access to the audio memory between the circuitry and the audio digital signal processor.

8. The video game system according to claim 7, wherein the audio memory controller provides higher access priority to the audio digital signal processor than to the circuitry.

9. The video game system according to claim 7, wherein the audio memory controller generates audio memory refresh cycles.

10. The video game system according to claim 7, wherein the audio memory controller provides audio memory initial timing generation to stabilize the audio memory after reset.

11. The video game system according to claim 1, wherein the circuitry further comprises:
    a buffer for storing data read from and written to the audio memory.

12. The video game system according to claim 1, wherein the first memory address register stores a main memory address and the second memory address register stores an audio memory address.

13. The video game system according to claim 1, wherein the circuitry further comprises:
    control logic for generating an interrupt.

14. The video game system according to claim 1, wherein the mass storage device comprises a DVD.

15. The video game system according to claim 1, wherein the non-audio-related data is read and written in 32 byte units.

16. A method of accessing non-audio-related data stored on a mass storage device, comprising:
    providing an audio memory separate from a main memory and storing therein audio-related data for processing by an audio digital signal processor;
    reading non-audio-related data stored on the mass storage device and writing the non-audio-related data to the audio memory; and
    later reading the non-audio data from the audio memory and writing the non-audio data to a main memory,
    wherein the writing to and reading from the audio memory comprises:
        specifying a first memory address;
        specifying a second memory address;
        specifying a block length; and
        changing the first memory address, the second memory address and the block length.

17. The method according to claim 16, wherein the audio memory comprises internal and external memory elements.

18. The method according to claim 16, wherein the audio memory comprises SDRAM.

19. The method according to claim 16, wherein the non-audio-related data comprises graphics data.

20. The method according to claim 16, wherein the non-audio-related data comprises animation data.

21. The method according to claim 16, wherein the non-audio-related data comprises compressed geometry data.

22. The method according to claim 16, wherein the mass storage device comprises a DVD.

23. The method according to claim 16, wherein the non-audio-related data is read and written in 32 byte units.

24. A video game machine comprising:
    a mass storage access device for accessing a mass storage device storing a video game program comprising video game data;
    a video game program executing system for executing the video game program;
    a main memory;
    an audio memory separate from the main memory;
    an audio digital signal processor for processing audio-related video game data stored in the audio memory; and
    memory access circuitry for writing non-audio-related video game data supplied from the mass storage device to the audio memory, and later reading out the non-audio-related video game data from the audio memory and supplying the read-out non-audio-related video game data to the main memory for processing by the video game program executing system.

25. The video game machine according to claim 24, wherein the mass storage access device comprises an optical disk access device.

26. The video game machine according to claim 24, wherein the memory access circuitry comprises:
- a main memory address register;
- an audio memory address register; and
- a block length register,
  - wherein the writing to and reading from the audio memory is performed in accordance with the contents of the main memory address register, the audio memory address register and the block length register.

27. The video game machine according to claim 26, wherein the contents of the main memory address register, the audio memory address register and the block length register are written by the video game program executing system.

28. The video game machine according to claim 24, wherein the non-audio-related data comprises graphics data.

29. The video game machine according to claim 24, wherein the non-audio-related data comprises animation data.

30. The video game machine according to claim 24, wherein the non-audio-related data comprises compressed geometry data.

31. The video game machine according to claim 24, wherein the memory access circuitry provides a direct memory access (DMA) channel.

32. The video game machine according to claim 24, wherein audio data stored in the audio memory comprises compressed audio data.

33. The video game machine according to claim 24, wherein audio data stored in the audio memory comprises an instrument wavetable.

34. The video game machine according to claim 24, wherein a run-time application of the video program executing system provides for simultaneous playback of audio tracks stored in the audio memory.

35. The video game machine according to claim 24, further comprising:
- an audio memory mode register for specifying one or more of a burst length, an audio memory addressing mode, a latency, and an audio memory access mode.

36. The video game machine according to claim 24, wherein a refresh period of the audio memory is programmable.

37. The video game machine according to claim 24, further comprising:
- an arbitration circuit for arbitrating audio memory read/write requests between the memory access circuitry and at least one other audio memory read/write request source.

38. The video game machine according to claim 37, wherein access to the audio memory by the memory access circuitry is maskable to provide dedicated audio memory access to one of the other audio memory read/write sources.

39. The video game machine according to claim 37, the audio memory is accessed by the memory access circuitry and the at least one other audio memory read/write source using an interleaved memory bank access scheme.

40. The video game machine according to claim 24, further comprising:
- a register location for specifying a direction of audio memory access.

41. The video game machine according to claim 24, wherein the non-audio-related video game data written to the audio memory by the memory access circuitry is supplied from the mass storage device to the memory access circuitry via the main memory.

42. The video game machine according to claim 24, wherein the non-audio-related video game data written to the audio memory by the memory access circuitry is supplied directly from the mass storage device to the memory access circuitry.

43. A pre-caching method for a video game machine comprising a mass storage access device for accessing a mass storage device storing a video game program comprising video game data; a video game program executing system for executing the video game program; a main memory; an audio memory separate from the main memory; and an audio digital signal processor for processing audio-related video game data stored in the audio memory, the method comprising:
- writing non-audio-related video game data supplied from the mass storage device to the audio memory; and
- later reading the non-audio video game data from the audio memory and writing the non-audio video game data to the main memory for processing by the video game program executing system.

44. The method according to claim 43, wherein the later reading comprises:
- specifying a main memory starting address, an audio memory starting address, and a block length; and
- reading the non-audio video game data from the audio memory and writing the non-audio video game data to the main memory in accordance with the specified main memory starting address, audio memory starting address and block length.

45. The method according to claim 43, wherein the non-audio video game data comprises graphics data.

46. The method according to claim 43, wherein the non-audio-related data comprises animation data.

47. The method according to claim 43, wherein the non-audio-related data comprises compressed geometry data.

48. The method according to claim 43, wherein the non-audio-related video game data written to the audio memory is supplied from the mass storage device via the main memory.

49. The method according to claim 43, wherein the non-audio-related video game data written to the audio memory is supplied directly from the mass storage device.

50. A video game machine comprising:
- mass storage access means for accessing a mass storage device storing a video game program comprising video game data;
- video game program executing means for executing the video game program;
- a main memory;
- an audio memory means separate from the main memory for storing audio-related video game data;
- an audio digital signal processing means for processing the audio-related video game data stored in the audio memory means; and
- writing/reading means for writing non-audio-related video game data supplied from the mass storage device to the audio memory means, and for later reading out the non-audio-related video game data from the audio memory means and supplying the read-out non-audio-related video game data to the main memory for processing by the video game program executing means.

* * * * *